United States Patent
Bontu et al.

(10) Patent No.: US 9,622,138 B2
(45) Date of Patent: *Apr. 11, 2017

(54) UE MEASUREMENT PROCEDURE IN A HETEROGENEOUS MOBILE NETWORK

(75) Inventors: Chandra Sekhar Bontu, Nepean (CA); Zhijun Cai, Herndon, VA (US); Yi Yu, Reston, VA (US); Yi Song, Plano, TX (US); Mo-Han Fong, Sunnyvale, CA (US); Rose Qingyang Hu, Providence, UT (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/985,764

(22) PCT Filed: May 31, 2011
(Under 37 CFR 1.47)

(86) PCT No.: PCT/US2011/038554
§ 371 (c)(1),
(2), (4) Date: Feb. 26, 2014

(87) PCT Pub. No.: WO2012/112184
PCT Pub. Date: Aug. 23, 2012

(65) Prior Publication Data
US 2014/0247810 A1    Sep. 4, 2014

Related U.S. Application Data

(60) Provisional application No. 61/443,389, filed on Feb. 16, 2011.

(51) Int. Cl.
H04W 36/30    (2009.01)
H04W 36/00    (2009.01)
(Continued)

(52) U.S. Cl.
CPC ........... H04W 36/30 (2013.01); H04W 24/02 (2013.01); H04W 24/10 (2013.01);
(Continued)

(58) Field of Classification Search
None
See application file for complete search history.

(56) References Cited

U.S. PATENT DOCUMENTS

2010/0182972 A1* 7/2010 Katayama et al. ........... 370/329
2011/0003598 A1* 1/2011 Ma et al. .................... 455/452.1
(Continued)

FOREIGN PATENT DOCUMENTS

CN    101637048    1/2010
CN    101964980    2/2011
(Continued)

OTHER PUBLICATIONS

Communication Pursuant to Article 94(3) EPC issued in European Application No. 11727573.5 on May 16, 2014; 5 pages.
(Continued)

*Primary Examiner* — Hassan Phillips
*Assistant Examiner* — Saba Tsegaye
(74) *Attorney, Agent, or Firm* — Fish & Richardson P.C.

(57) ABSTRACT

A method and system for formulating an SINR metric for cells using only the existing RSRP and RSRQ measurements. With this method and system side information is exchanged between eNBs of an E-UTRAN using the X2 interface where the X2 interface carries the X2 Application Protocol (X2AP). The side information is introduced either within X2AP messages exchanged between eNB nodes or via modification of existing X2AP messages. Serving cell system information block (SIB) messages may also be modified or new SIB messages introduced to facilitate computation of an SNIR metric at a UE.

26 Claims, 15 Drawing Sheets

(51) Int. Cl.
   *H04W 24/10*  (2009.01)
   *H04W 24/02*  (2009.01)
   *H04W 92/20*  (2009.01)

(52) U.S. Cl.
   CPC ... *H04W 36/0061* (2013.01); *H04W 36/0094* (2013.01); *H04W 36/0055* (2013.01); *H04W 92/20* (2013.01)

(56) References Cited

U.S. PATENT DOCUMENTS

| | | | |
|---|---|---|---|
| 2011/0092167 A1* | 4/2011 | Dottling et al. | 455/67.11 |
| 2011/0170496 A1* | 7/2011 | Fong et al. | 370/329 |
| 2011/0200014 A1 | 8/2011 | Lee et al. | |
| 2011/0211560 A1* | 9/2011 | Yamamoto | H04W 36/20 370/332 |
| 2011/0306340 A1* | 12/2011 | Lindoff et al. | 455/434 |
| 2012/0002581 A1 | 1/2012 | Anderson et al. | |
| 2012/0063417 A1* | 3/2012 | Redana et al. | 370/331 |
| 2012/0082022 A1* | 4/2012 | Damnjanovic et al. | 370/201 |
| 2013/0153298 A1 | 6/2013 | Pietraski et al. | |
| 2014/0233408 A1 | 8/2014 | Bontu et al. | |
| 2014/0369336 A1* | 12/2014 | Prakash et al. | 370/338 |

FOREIGN PATENT DOCUMENTS

| | | |
|---|---|---|
| EP | 2262313 | 12/2010 |
| WO | 2008/112255 | 9/2008 |
| WO | 2009/025494 | 2/2009 |
| WO | 2009/113928 | 9/2009 |
| WO | 2009/129413 | 10/2009 |
| WO | 2010/121661 | 10/2010 |

OTHER PUBLICATIONS

"3rd Generation Partnership Project; Technical Specification Group Radio Access Network; Physical Layer; Measurements (TDD) (Release 10)"; Draft 3GPP TS 25.225 V10.0.0; Dec. 2010; 20 pages.

"3rd Generation Partnership Project; Technical Specification Group Radio Access Network; Evolved Universal Terrestrial Radio Access (E-UTRA); Physical Layer; Measurements (Release 10)"; Draft 3GPP TS 36.214 V10.0.0; Dec. 2010; 13 pages.

"3rd Generation Partnership Project; Technical Specification Group Radio Access Network; Evolved Universal Terrestrial Radio Access Network (E-UTRAN); X2 Application Protocol (X2AP) (Release 10)"; 3GPP TS 36.423 V10.0.0; Dec. 2010; 123 pages.

International Search Report and Written Opinion of the International Searching Authority issued in International Application No. PCT/US2011/038554 on Dec. 7, 2011; 10 pages.

International Search Report and Written Opinion of the International Searching Authority issued in International Application No. PCT/US2011/038559 on Dec. 6, 2011; 10 pages.

Canadian Office Action in Canadian Application No. 2,827,406, dated Feb. 19, 2015, 5 pages.

Canadian Office Action in Canadian Application No. 2,827,427, dated Mar. 13, 2015, 3 pages.

Office Action issued in U.S. Appl. No. 13/985,774 on Apr. 28, 2015, 24 pages.

Office Action issued in related Chinese Application No. 201180070181.X on Aug. 3, 2016.

Office Action issued in Chinese Application No. 201180070174.X on Sep. 2, 2016.

* cited by examiner

UE MEASUREMENT PROCEDURE IN A HETEROGENEOUS MOBILE NETWORK

CROSS-REFERENCE TO RELATED APPLICATIONS

This application is a U.S. National Stage of PCT/US2011/038554 filed on May 31, 2011, which claims priority to U.S. Patent Application No. 61/443,389, filed on Feb. 16, 2011, includes exemplary systems and methods and is incorporated by reference in its entirety.

PCT Patent Application No. PCT/US2011/038559, entitled "Procedure for Formulating a Signal to Interference Plus Noise Ratio", filed on May 31, 2011, describes exemplary methods and systems and is incorporated by reference in its entirety.

BACKGROUND OF THE INVENTION

Field of the Invention

The present invention is directed in general to communications systems and methods for operating same, and more particularly to user equipment measurement procedures in a heterogeneous mobile network.

Description of the Related Art

In known wireless telecommunications systems, transmission equipment in a base station or access node/device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B), that can provide a communication device, such as user equipment (UE) or mobile equipment (ME), with access to other components in a telecommunications system.

In mobile communication systems such as an E-UTRAN, the access device provides radio accesses to one or more communication devices. The access node/device comprises a packet scheduler for allocating uplink (UL) and downlink (DL) data transmission resources among all the UEs communicating to the access node/device. The functions of the scheduler include, among others, dividing the available air interface resources between the communication devices, deciding the resources (e.g. sub-carrier frequencies and timing) to be used for each packet data transmission, and monitoring packet allocation and system load. The scheduler allocates physical layer resources for physical downlink shared channel (PDSCH) and physical uplink shared channel (PUSCH) data transmissions, and sends scheduling information to the communication devices through a control channel, such as physical downlink control channel (PDCCH). The communication devices refer to the scheduling information for the timing, frequency, data block size, modulation and coding of uplink and downlink transmissions.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 1:
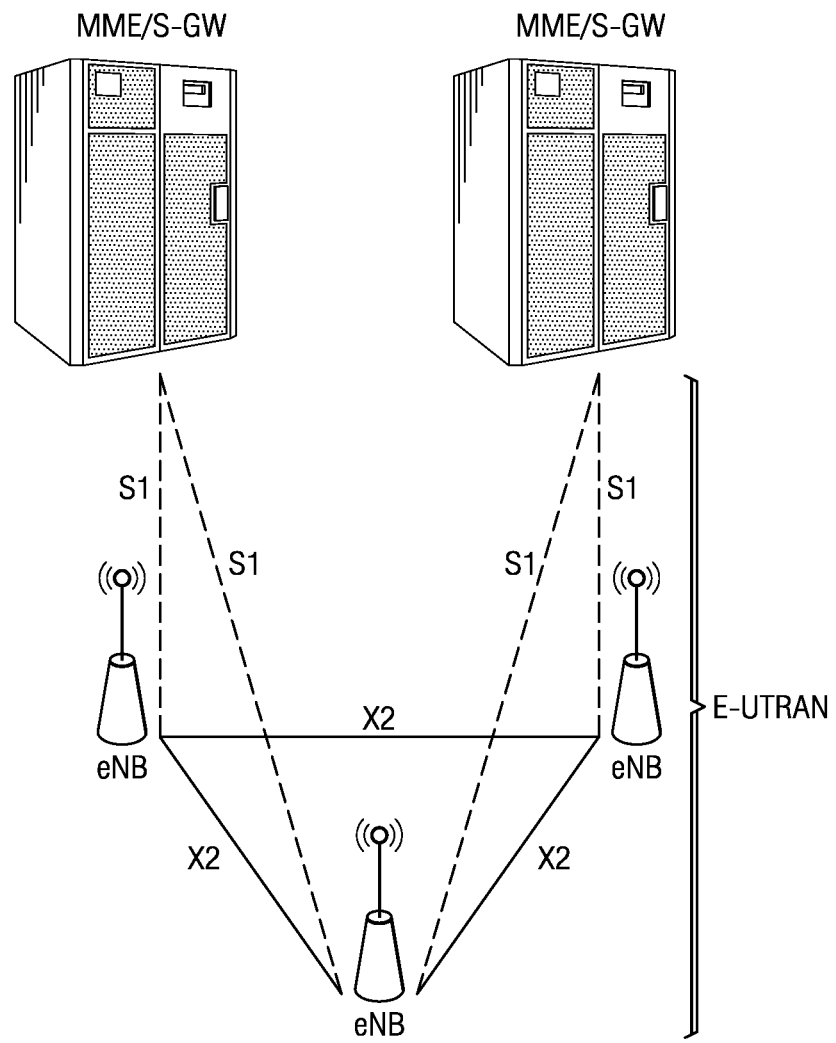
FIG. 1 shows a block diagram of a E-UTRAN connected to an EPC.

The 3$^{rd}$ Generation Partnership Project (3GPP) standard defines an Evolved UMTS Radio Access Network (E-UTRAN) for providing wireless radio access between UE devices and an Evolved Packet Core (EPC) network. As shown in FIG. 1, the EPC includes core network nodes such as a Serving Gateway (S-GW) and a Mobility Management Entity (MME). The E-UTRAN includes eNB nodes. The eNB nodes are connected to the core network nodes (such as MME and S-GW) via an S1 interface (i.e., a reference point for the control plane protocol between E-UTRAN and MME or between E-UTRAN and Serving GW for the per bearer user plane tunneling) which may carry user plane and control plane data. The eNB nodes are directly interconnected with other eNB nodes via an X2 interface (i.e., reference point for the control and user plane protocol between two eNBs) which may be used to provide coordination amongst eNB nodes within E-UTRAN.

As defined in known 3GPP standards, UEs measure Reference Signal Received Power (RSRP) and Reference Signal Received Quality (RSRQ) with respect to the serving/camped cell and the neighbor cells as a measure of received signal strength and quality. UEs in the active (Radio Resource Control (RRC) connected) mode report these measurements to the serving cell. The serving cell may use these reported measurements to decide an appropriate target cell for the UE in case of a hand-over. This is known as active mode mobility (mobility during RRC connected state) or network controlled mobility. UEs in the idle mode may use these measurements to select/reselect an appropriate cell to camp-on and send a tracking area update message to the network only in the event that a new camped-on cell is within a new tracking area. This is known as idle mode mobility (mobility during RRC idle state) or UE controlled mobility.

In general, an appropriate cell to hand-over/camp-on is the cell whose transmitted packets can be detected with reasonable error rate or one in which the utilization of radio resources is minimized (resources include time/frequency/code resources, required transmit power or interference generated). An indication of packet error rate can be predicted by knowing the receive power of the signal transmitted by the serving cell (wanted signal) and the power of the interference from all the other cells (unwanted signal) plus noise.

A reference signal receive power (RSRP) and a reference signal receive quality (RSRQ) as defined in 3GPP TS 36.214 v9.1.0 (2010 March) provide an indication of the signal quality measures to ensure a UE/serving cell can pick an appropriate target cell. In general, signal to interference plus noise ratio (SINR), represented as the ratio of the receive power of the signal transmitted by the serving cell (wanted signal) to the power of the interference from all the other cells (unwanted signal) plus noise is one such metric to ensure good quality reception. This SINR metric is therefore representative of the ratio of wanted intra-cell signal power to all the inter-cell power plus noise power.

In 3GPP LTE, time/frequency physical resources for radio transmission are defined in terms of resource elements (RE). An RE is defined as a frequency unit of one sub-carrier of an orthogonal frequency division multiplexing (OFDM) waveform (for downlink) or single carrier frequency division multiple access (SC-FDMA)/discrete frequency spread OFDM (DFT-SOFDM) waveform (for uplink) during one OFDM or SC-FDMA symbol in time. In certain LTE systems, a sub-carrier comprises one 15 kHz unit of frequency resource. An OFDM or SC-OFDMA symbol may comprise a basic OFDM symbol followed by a cyclic prefix (CP). The duration of the OFDM symbol including the CP may vary depending on the system configuration. In one example of an LTE system with normal cyclic prefix, the duration of the OFDMA symbol including CP is approximately 71.4 microseconds.

Figure 2:
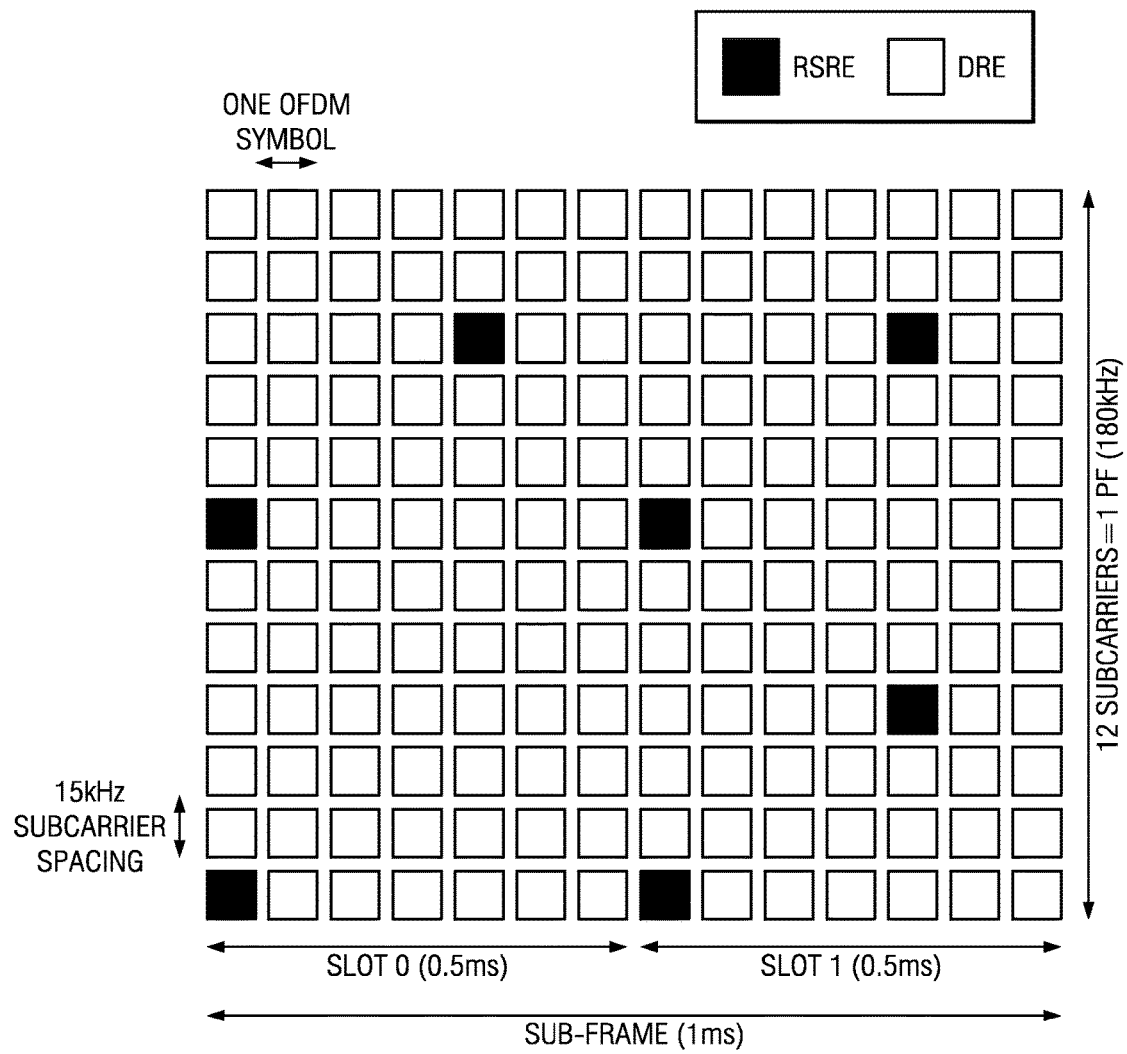
FIG. 2 shows a block diagram of a time/frequency physical resource structure for an LTE downlink.

Frequency resources are allocated by the system in groups of 12 sub-carriers, termed a physical resource block or PRB. A PRB is thus 180 kHz wide. Time resources are allocated by the system in units of 1 ms sub-frames. Each sub-frame may comprise two slots, each further comprising 6 or 7 OFDM symbols depending on system configuration. FIG. 2 shows an example of the time/frequency resource elements (REs) for downlink comprising one PRB in one sub-frame. One PRB in one sub-frame shall be referred to hereon as a "PRB allocation unit."

FIG. 2 also shows that (in the downlink case shown) some of the REs within an RB allocation unit are used for transmission of common reference signals (CRS) from antenna port 0. These REs are referred to as Reference Signal Resource Elements (RSRE). Other REs (non-RSRE) are referred to as Data Resource Elements (DRE).

Referring to FIG. 2 RSRP and RSRQ are defined within 3GPP TS 36.214 v9.1.0 (2010 March). More specifically, the Reference Signal Received Power (RSRP) is measured using OFDM symbols that contain reference signals (RS). The resource elements (RE) that are occupied by the Reference Symbol (RS) are termed RSRE and are those that are used to measure RSRP. The RSRP is defined in 3GPP as the linear average over the power contribution of the resource elements that include common reference signals (CRS) within the considered measurement frequency bandwidth (UE implementation). RSRP is determined over CRS transmitted over antenna port-0, $CRS_0$. If the UE can reliably detect the CRS transmitted over antenna port-1, $CRS_1$, UE may use $CRS_1$ in addition to $CRS_0$ to determine the RSRP. In the 3GPP definition, RSRP is a per-RE measure of received power, made on RSRE.

Reference Signal Received Quality (RSRQ) is defined as the ratio:

$$RSRQ = K * \frac{RSRP}{EUTRA\ Carrier\ RSSI}$$

where:
K is the number of RBs of the E-UTRA carrier Received Signal Strength Indicator (RSSI) measurement bandwidth;
The measurements in the numerator and denominator are made over the same set of K resource blocks.
RSSI comprises the linear average of the total received power observed only in OFDM symbols containing reference symbols for antenna port-0, within the measurement bandwidth, over K number of resource blocks by the UE from all sources, including co-channel serving and non-serving cells, adjacent channel interference, thermal noise etc.

Thus, RSSI is averaged in time over observations of the total power measured within the full carrier bandwidth. RSSI is therefore a power metric within a bandwidth comprising K RBs, and is not a per RB power metric.

When reporting RSRP and RSRQ measurements, additional time-domain averaging may be applied by the UE (known as L3 filtering). When L3 filtering is applied, values measured over the subframes are averaged in time according to L3 averaging parameters which may be informed to the UE by the eNB node. When L3 filtering is applied, the RSRP during the ith subframe can be expressed as RSRP(i)=gβ(i)+(1−g)RSRP(i−1), where β(i) represents the power contribution of resource elements that include CRS within the considered measurement bandwidth during the ith subframe. g is the L3 filtering parameter for RSRP. Similarly, RSSI during the ith subframe can be expressed as; RSSI(i)=gζ(i)+(1−g)RSSI(i−1), where ζ(i) represents the RSSI measured over the ith subframe. g is the L3 filtering parameter for RSSI.

In a situation where a UE is moving (or may be moved) to a new cell for a better user experience, one of the robust ways of deciding a better target cell is by checking (Check-1) whether the RSRP with respect to the target cell is acceptable. i.e., ($RSRP_T > \zeta$) and (Check-2) whether the RSRP with respect to the target cell is better than the RSRP with respect to the current serving cell by a specified threshold, i.e. ($RSRP_T - RSRP_S$)>ξ. The efficiency of hand-over algorithms in a cellular system is typically measured in terms of packet interruption time and call drops. The packet interruption time is increased generally by longer hand-over time and un-necessary hand-over. Hand-over interruption time is optimized in LTE and in other fourth generation cellular systems.

By checking whether the RSRP of the target cell is better than the RSRP of the current serving cell (i.e., Check 2), ensures that the UE is moving to a better cell such that another hand-over is not warranted immediately after the UE moves to the new target cell.

However, as per the definition of RSRP, RSRP is measured based on the reference symbol transmissions from the cell, which are transmitted all the time at a fixed power level. However, use of only RSRP when formulating handover or mobility decisions is not able to account for possible cases where the neighboring cells are not fully loaded, or not all the radio resources are not fully utilized (or transmitted at a lesser transmit power level). In these cases, it is beneficial to take into account also the actual interference levels on the control channel (PDCCH) or on the data channel (PDSCH) that would be observed if the UE were to move to the target cell, to more fully assess the potential user experience on the target cell. Note that for a perfectly load balanced network, the check points may work reasonably well and the need for checking the interference levels may be reduced.

Typically, the signal quality experienced by a UE is a function of the wanted signal power from the serving cell (intra cell power) and of the interference signal power. The interference power may come from either other users being served within the serving cell, from other users being served by other—non-serving, or neighbor-cells, or from other sources of interference such as thermal noise. For certain systems having an orthogonal multiple access scheme within a cell (such as OFDM in LTE), interference from other users in the serving cell can often be mitigated and may be reduced or ignored.

When in the possession of reported RSRP and RSRQ measurements a network element such as an eNB may be able extract an estimate of the RSSI, which includes the total received power at the UE. At the UE, a direct measurement of the RSSI may be available. By subtracting the RSRP and any known serving cell DRE power from the estimated RSSI, the eNB or UE may be able to form an estimate of the power received at the UE from all non-serving (neighboring) cells. However, the eNB or UE may not have knowledge of the actual interference levels caused by each neighboring cell over the PDCCH or PDSCH regions separately. Hence an estimate of the potential user experience if handed over to a particular target cell is desirable. Further explanation is provided in the ensuing sections of this document.

In certain aspects of the present invention, transmissions from all the network nodes/cells are assumed to be slot synchronized (not necessarily radio-frame/subframe synchronized). (A slot/subframe/radio frame is defined in 3GPP TS 36.211.). However, the present invention is equally applicable to scenarios where the transmissions from all the network nodes are not time synchronized or roughly synchronized. A UE measures RSRP and RSRQ with respect to the serving cell and neighboring cells autonomously when in RRC idle mode, or as directed by the serving/camped cell when in RRC-connected mode (for example via measurement control messages sent from eNB to UE).

As defined in 3GPP TS 36.214 v9.1.0 (2010 March), a UE measures RSRP with respect to the serving node and all the ($M_a - 1$) neighboring nodes:

$$\{RSRP_l, l=0, \ldots, M_a-1\}$$

where $RSRP_l$ corresponds to the UE measured RSRP value with respect to the cell-l. If the estimation errors are ignored, the RSRP with respect to cell-l can be expressed as:

$$RSRP_l = L_l \bar{P}_{Rl} \quad (1)$$

where $L_l$ is the path loss between the lth node/cell and the UE and $\bar{P}_{Rl}$ represents the average transmit power per RSRE of the lth network node.

Figure 3:
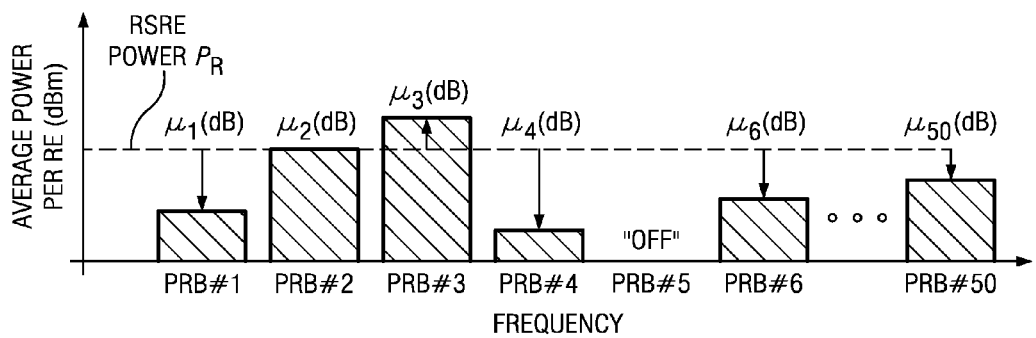
FIG. 3 shows a chart of transmitted power variation across PRBs within a cell.

Generally speaking, eNB nodes may transmit DRE with per-RE power levels that differ from the per-RE power levels used for Reference Signal transmission. Furthermore, depending on the loading of a given cell, some DRE may not be transmitted at all, thereby lowering the average DRE transmit power within the cell. As shown in FIG. 3, the DRE associated with one PRB are transmitted with a power (on a logarithmic power scale such as dBm) equal to the RS transmit power minus a power offset factor μ dB. μ may differ for each PRB. The DRE within PRB#2 are each transmitted with the same power as the RSRE (i.e. μ=1, or put logarithmically, 0 dB) and no data is transmitted on PRB#5. In this specific example, a 10 MHz LTE system, which includes 50 RBs is depicted.

A UE measures RSSI over the carrier frequency of the serving node. If there are M−1 neighbouring nodes operating on the same downlink carrier frequency as the serving node, the RSSI includes the received signal power from the M−1 neighbouring cells plus the received signal power received from the serving cell. (The remaining $M_a-M$ nodes are operating on a different carrier frequency.) The UE also measures RSSI over all the other carrier frequencies (which are advertised by the serving cell). The RSSI, thus measured can be expressed as:

$$RSSI = 2K \left\{ \underbrace{\left(\sum_{i=0}^{M-1} L_i \bar{P}_{Ri}\right)}_{RSRE} + 5\underbrace{\left(\sum_{i=0}^{M-1} L_i \bar{P}_{Di}\right)}_{DRE} + N_0 \right\} \text{ or} \quad (2)$$

$$RSSI = 2K \left\{ \underbrace{L_\ell \bar{P}_{R\ell} + \sum_{\substack{i=0 \\ i \neq \ell}}^{M-1} L_i \bar{P}_{Ri}}_{RSRE} + 5\underbrace{\left(L_\ell \bar{P}_{D\ell} + \sum_{\substack{i=0 \\ i \neq \ell}}^{M-1} L_i \bar{P}_{Di}\right)}_{DRE} + N_0 \right\}$$

Where K represents the number of RBs over which the RSSI is measured. $N_0$ represents the average thermal noise power measured over a 90 kHz bandwidth. The factor of 2 appears due to the reference signal pattern repeating twice within a resource block (i.e. the RS pattern repeats every 6 sub-carriers yet an RB includes 12 sub-carriers) (See e.g., FIG. 2.) $\bar{P}_{Di}$ represents the average transmit power per DRE of the ith cell defined as:

$$\bar{P}_{Di} \triangleq \left\langle \frac{1}{K} \sum_{j=0}^{N-1} u(j) P_{Di}(j) \right\rangle = \bar{P}_{Ri} \left\langle \frac{1}{K} \sum_{j=0}^{N-1} u_i(j) \mu_i(j) \right\rangle = \bar{P}_{Ri} \alpha_i \quad (3)$$

where $\mu_i(j)$ is the ratio of the average transmit power of DRE over the jth RB to the average transmit power of the RSRE if there is data transmission over that RB. $u_i(j)$ is equal to 1 if the jth RB is assigned to any UE or 0 otherwise. When $u_i(j)$ is 0, $u_i(j)$ is undefined and $\langle x \rangle$ represents the time average of, i.e. L3 filtering. Note that $\mu_i(j) \in \{0.25, 0.3334, 0.5, 0.6667, 1, 1.2589, 1.5849, 2.0\}$.

The parameter $\alpha_i$ represents the average transmit power level of the data RE normalized to the average power level of the RSRE for cell-i. It is also evident that $\alpha_i$ also includes the average system load of cell-i.

In Equation (2), the first term represents the received RSRE signal contribution from the serving cell and the second term represents the received RSRE signal contribution from the neighboring cells. The third and fourth terms represent the received DRE contribution from the serving and the interfering cells respectively.

RSRQ with respect to cell-l is calculated from RSRP and RSSI as:

$$RSRQ_\ell = \frac{K * RSRP_\ell}{RSSI} \quad (4)$$

Figure 4:
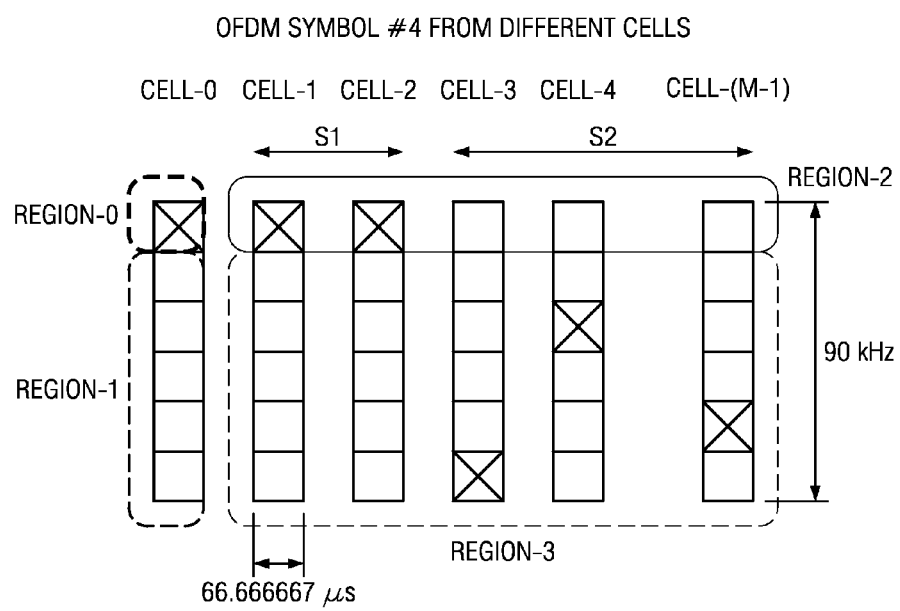
FIG. 4 shows a block diagram of n interpretation of an RSSI.

Referring now to FIG. 4, a block diagram of an OFDM symbol number four (or in general any OFDM symbol within one subframe which consists of RS REs) of the OFDM slot structure (see e.g., FIG. 2) arriving at a UE from all the cells. Only half of a PRB (6 subcarriers) are shown due to the structure repeating in frequency every 90 kHz. Assuming RSRP and RSRQ are measured with respect to cell-1 and further if $R_{0l}$, $R_{1l}$, $R_{2l}$ and $R_{3l}$ are the average powers measured over the regions, 0, 1 2 and 3 respectively (region 0 and region 1 correspond to signals received from a serving cell whereas region 2 and region 3 correspond to signals received from non-serving (or interfering) cells.), Equation (2) can be rewritten as:

$$RSSI = 2K \left\{ \underbrace{L_\ell P_{R\ell}}_{R_{0\ell}} + \underbrace{5L_\ell \bar{P}_{D\ell}}_{R_{1\ell}} + \underbrace{\sum_{\substack{i=0 \\ i \neq \ell}}^{M-1} L_i \bar{P}_{Ri}}_{R_{2\ell}} + \underbrace{5 \sum_{\substack{i=0 \\ i \neq \ell}}^{M-1} L_i \bar{P}_{Di}}_{R_{3\ell}} + N_0 \right\} \quad (5)$$

or, $$RSSI = 2K\{R_{0\ell} + R_{1\ell} + R_{2\ell} + R_{3\ell} + N_0\} \quad (6)$$

Using equation (6), RSRQ can be expressed as follows:

$$\frac{1}{RSRQ_\ell} = \frac{RSSI}{K * RSRP_\ell} = \frac{2\{R_{0\ell} + R_{1\ell} + R_{2\ell} + R_{3\ell} + N_0\}}{RSRP_\ell} \quad (7)$$

Note that $R_{0l}$ represents RSRP. If downlink power allocation (DLPA) is not enabled and the serving cell is fully loaded, $R_{1l}/R_{0l}=5$. Downlink power allocation is disabled if p–b in PDSCH-ConfigCommon IE is set to 0 and p–a in PDSCH-ConfigDedicated IE is set to dB0. With these parameter settings, the average power level over the RSRE and DRE (in the OFDM symbol with or without RSRE) is equal.

$(R_{2l}+R_{3l}+N_0)/6$ represents the average interference power per-RE from all the other cells. In this case, Equation (7) reduces to the following:

$$\frac{1}{RSRQ_\ell} = 2\{6 + (R_{2\ell} + R_{3\ell} + N_0)/R_{0\ell}\} \quad (8)$$

Another way of re-writing Equation (8) is as:

$$\frac{1}{RSRQ_\ell} = 2\left\{6 + \frac{6}{\gamma_{4\ell}}\right\} \quad (9)$$

where:

$$\gamma_{4\ell} \triangleq \frac{R_{0\ell}}{(R_{2\ell} + R_{3\ell} + N_0)/6} \quad (10)$$

i.e. $\gamma_{4l}$ is the ratio of the RSRP to the average interference power received from all other cells over the RSRE and DRE. $\gamma_{4l}$ may be considered one measure of SINR and in this instance is equal to the ratio of intra-cell power to inter-cell power as observed at the UE receiver. If the minimum SINR is assumed to be $\gamma_{4l}=-8$ dB, then according to Equation 9 the minimum value of RSRQ is $-19.5$ dB for the fully loaded case (reported RSRQ values for lower loading at the same minimum SINR of $-8$ dB will be higher than this minimum RSRQ value).

Similarly the maximum value of RSRQ is determined by assuming that the system load for all the nodes is zero, i.e. only RSRE is transmitted from all the cells. For this case, RSRP=$R_{0l}$ and Equation 9 becomes:

$$\frac{1}{RSRQ_\ell} = 2\left\{1 + \frac{6}{\gamma_{4\ell}}\right\} \quad (11)$$

The value $\gamma_{4l}$ is representative of the ratio of the reference signal intra-cell power to the mean inter-cell power received at the UE. In cases of high SINR (i.e. where this ratio approaches infinity), $RSRQ_l$ approaches 0.5 (equal to $-3$ dB) for the no-loading cases.

These maximum and minimum numbers for the reported RSRQ range agree with Section 9.1.7 of 3GPP TS 36.133 V9.3.0 (2010 March).

To accurately control UE mobility, it may be beneficial to form an intra-cell to inter-cell power ratio (such as the $\gamma_{4l}$ SINR metric of Equation 10 for each candidate cell.

The denominator of Equation (10) indicates that the SINR as measured is inversely proportional to the cell loading of the interfering cells. If the interference is low and SINR is acceptable, the UE should stay with the serving cell to avoid unnecessary handovers thus reducing the data interruption. An SINR can also be defined as a ratio of RSRP of the serving cell to the sum of RSRPs from the interfering cells. The SINR thus defined does not include the inter-cell loading and may perform unnecessary handovers even when the cells are lightly loaded.

The RSRQ of cell-l can be expressed as:

$$RSRQ_\ell = K * \frac{RSRP_\ell}{RSSI_\ell} = \frac{1}{2 + 10\alpha_\ell + \frac{12}{\gamma_\ell}}$$

where $\alpha_l$ is dependent on DL transmission power setting and the radio resource loading of cell-l.

Which can be further re-expressed as:

$$\gamma_\ell = \frac{12}{\frac{RSSI_\ell}{K * RSRP_\ell} - (10\alpha_\ell + 2)}$$

If the DL transmission from all the cells are assumed to be synchronized, $RSSI_l$=RSSI for l=0, 1, ..., M−1 (i.e. RSSI is a measure of all power incident at the UE receiver and does not vary on a cell-by-cell basis). Thus, there can be two cells l1 and l2 that exist with the condition (for the same RSSI value):

$$RSRP_{\ell 1} > RSRP_{\ell 2}$$
&
$$\gamma_{\ell 1} < \gamma_{\ell 2}$$

When this condition occurs, if the UE moves to a target cell with the highest RSRP, it may not necessarily be the cell with the best SINR and a handover or cell reselection to another cell may result in improved SNIR. If $\alpha_l$ is known a priori the hand-over or cell reselection can be made more prudently.

In the case of UE-controlled mobility, this metric would need to be derived by the UE. For network controlled mobility, the metric may either be derived by the UE and reported to the network, or the UE may report other values (including for example RSRP and RSRQ metrics) and the network may attempt to subsequently derive the SINR metric. It is therefore of relevance to have knowledge of whether an accurate SINR metric may be obtained from the current reported values of RSRP and RSRQ. As such, the mapping between the RSRQ and SINR, ($=\gamma_{4l}$), is investigated further in a network with nodes with different system loads and also when the DLPA is enabled.

Figure 5:
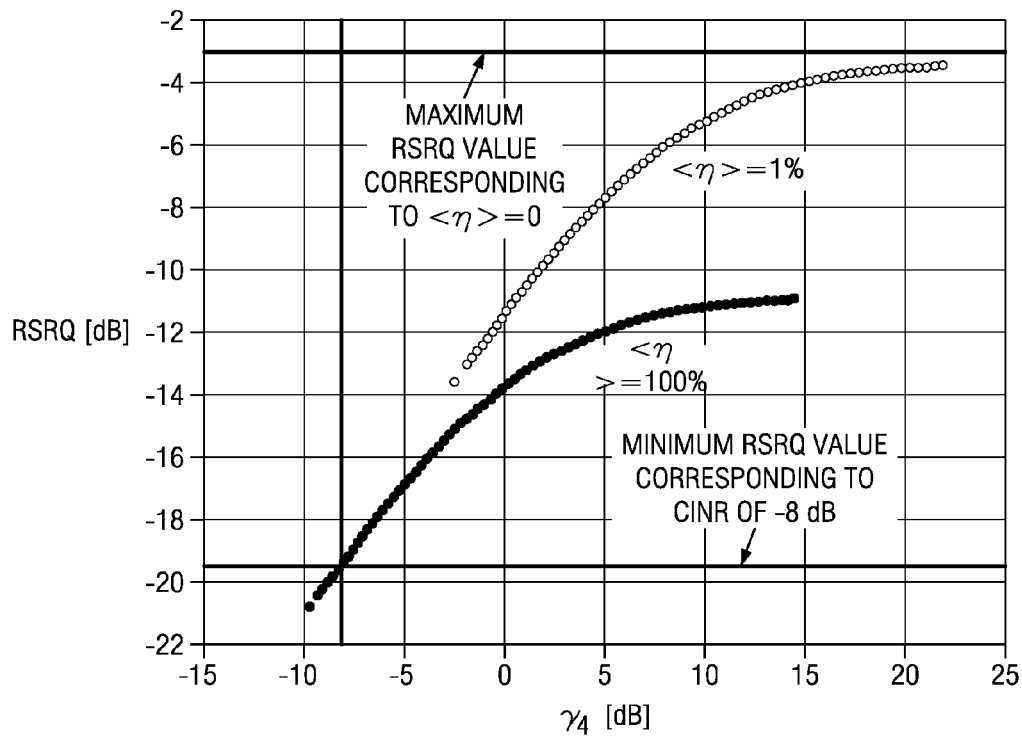
FIG. 5 shows a SINR to RSRQ mapping for different average system loads.
Figure 6:
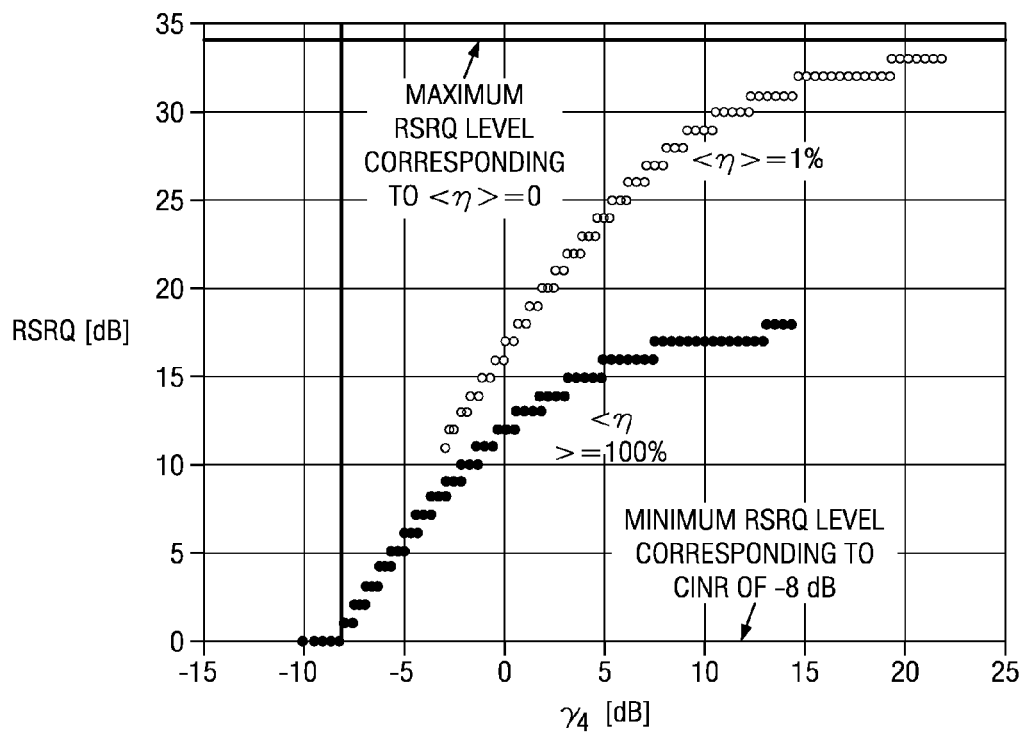
FIG. 6 shows a SINR to RSRQ quantized level mapping for different average system loads.

FIG. 5 shows the mapping between the RSRQ and SINR when DLPA is disabled (i.e. DRE have the same power— when transmitted—as RSRE within each cell). In this example, it is assumed that the network load is equally distributed across all the cells/nodes (perfect load balancing), i.e.

$$\eta_i = \langle \eta \rangle = \frac{1}{M} \sum_{i=0}^{M-1} \eta_i,$$

where $\eta_i$ represents the system load of the node-i. It is evident from the results that the non-linear mapping between the RSRQ and SINR is dependent on the average system load of the network. Therefore, in a network where the system load is equally shared by all the nodes, the cells can convert the received RSRQ value into a meaningful SINR. (i.e., RSRQ with respect to different network nodes is consistently mapped into a unique value of SINR (which may include a fixed bias for all the nodes).) FIG. 6 shows the mapping between the RSRQ quantization levels as defined in 3GPP TS 36.133 V9.3.0 (2010 March) and the SINR, $\gamma_{4l}$ metric of equation 8a for low and high loading cases. FIG. 6 shows the same mappings but with quantized values of RSRQ to enable RSRQ reporting.

Figure 7:
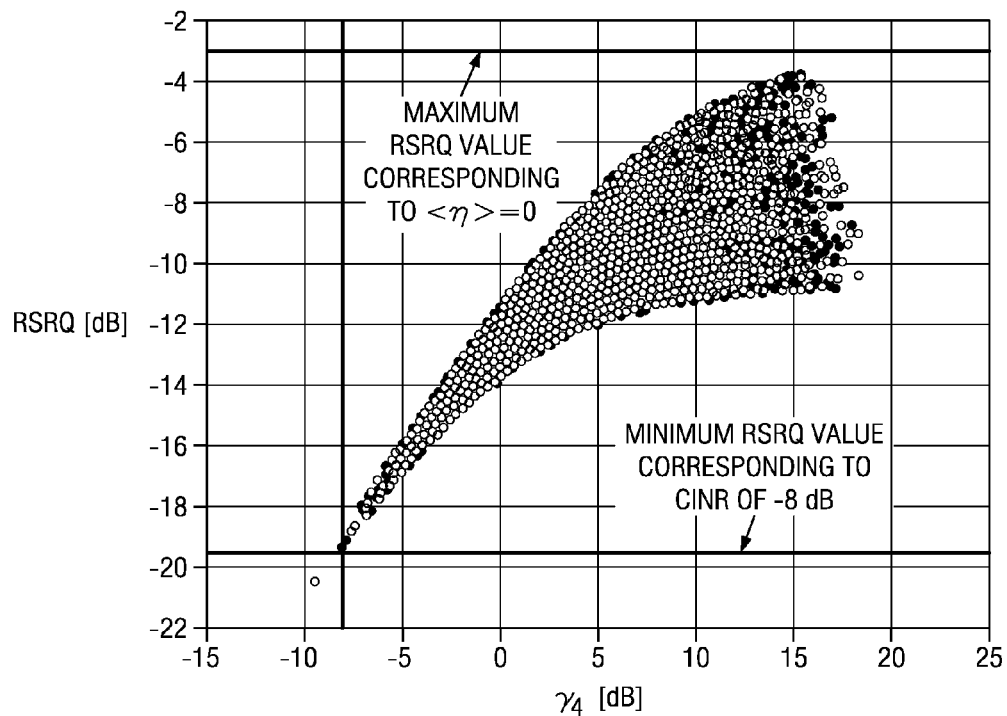
FIG. 7 shows a SINR to RSRQ mapping in an unbalanced network.

If the network load is not equally distributed across the cells (this can be a common situation within cellular networks as the load may vary both in time and geographically), the RSRQ with respect to each cell may map in to different SINR values. A typical LTE heterogeneous network may include macro cells, pico cells, relay nodes etc. A pico cell may have a lower transmit power capability than a micro or macro cell. Therefore in this scenario, the radio resource usage in each cell within a network may differ considerably compared to a homogeneous network where all the cells within a network have equal or nearly equal capabilities. Error! Reference source not found. FIG. 7 shows the mapping of RSRQ reported with respect to different cells in the network and the actual SINR. As shown, the reported RSRQ maps into different SINR values based on the system load of that particular cell/node.

Figure 8:
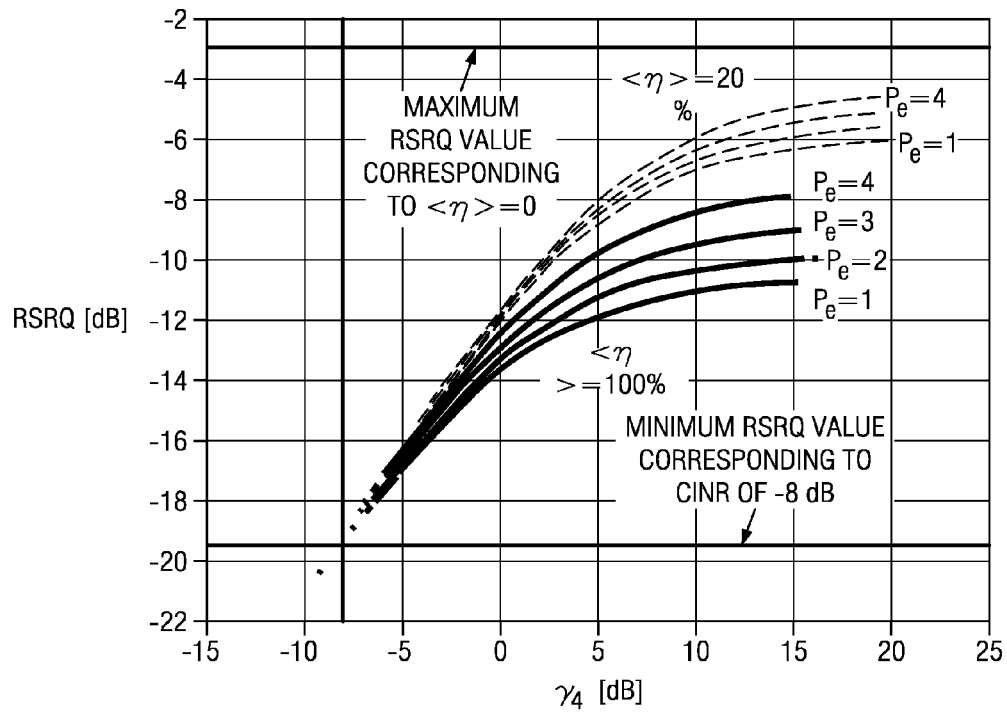
FIG. 8 shows a SINR to RSRQ mapping for different average system loads.

FIG. 8 shows the mapping of RSRQ and SINR of a perfectly balanced network with DLPA enabled for different average system loads, $\langle \eta \rangle$. It is evident that the non-linear mapping between RSRQ and SINR is also dependent on the DLPA settings.

Figure 9:
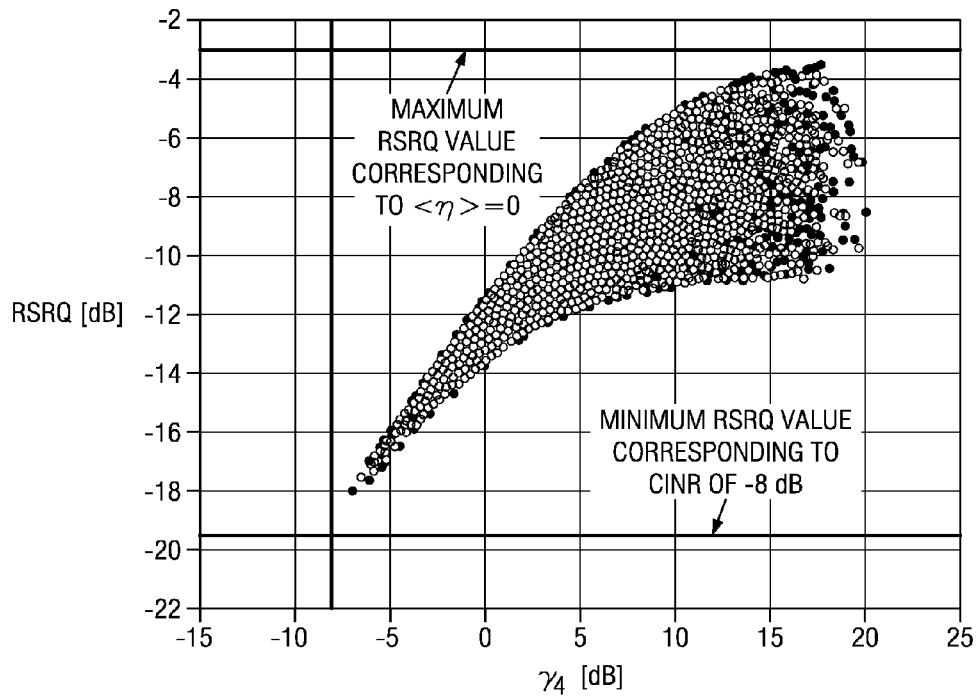
FIG. 9 shows a SINR to RSRQ mapping when DLPA is enabled in a system load

FIG. 9 shows the mapping when the DLPA is enabled for an unbalanced network.

The nature of the results can be explained by rewriting Equation 7 as:

$$\frac{1}{RSRQ_\ell} = 2\left\{1 + \frac{R_{1\ell}}{R_{0\ell}} + \frac{6}{\gamma_{4\ell}}\right\} \quad (12)$$

Where $$\gamma_{4\ell} \triangleq \frac{R_{0\ell}}{(R_{2\ell} + R_{3\ell} + N_0)/6}$$

(i.e. the ratio of the RSRP to the average interference power received over the RSRE and DRE as defined in Equation 10). The factor $R_{1l}/R_{0l}$, from the definition of the regions in FIG. 4 represents the cell load and the downlink power allocation of cell-l. Therefore if the loading across the cells within the network is not equal and the DLPA is enabled at some or all of the network nodes, the mapping between the SINR and the measured RSRQ may not be consistent.

For RSRQ to indicate a proper representation of SINR for non-serving cells, a plurality of assumptions are necessary. More specifically, DLPA is disabled and all the neighboring nodes are equally loaded (i.e. perfect load balancing).

When these conditions do not apply, the network or UE may find it difficult to ascertain an accurate SINR value representative of the true loading condition of each of the contributing cells. This may preclude the use of mobility algorithms and procedures that are reliant upon the availability of an accurate SINR metric.

Thus, the RSRQ can be expressed as:

$$RSRQ_\ell = K * \frac{RSRP_\ell}{RSSI_\ell} = \frac{1}{2 + 10\alpha_\ell + \frac{12}{\gamma_\ell}} \quad (13)$$

The second term in the denominator, $$\alpha_\ell = \frac{10\bar{P}_{D\ell}}{RSRP_\ell}$$

(where $\alpha_l$ varies from 0 to 2 for PDSCH and the range of $\alpha_l$ for other physical channel may be implementation dependent) depends on the radio resource usage or the cell loading in cell-l. In other words, the RSRQ measured with respect to cell-l is influenced by the radio resource usage in cell-l. For example, a UE may measure RSRQ with respect to cell-l1 and cell-l2, $RSRQ_{l1}$ and $RSRQ_{l2}$ respectively.

The UE may select cell-l2 as a better target cell to move-on, if $RSRQ_{l1} < RSRQ_{l2}$. But there is possibility that $\gamma_{l1} > \gamma_{l2}$ based on the system load at cell-l1 and cell-l2. For example this condition may occur when $$\alpha_{\ell 1} > \frac{6}{5}\alpha_{\ell 2}$$

and $\gamma_{l1} = 2\gamma_{l2}$. In other words, the UE may prefer a cell with less system load even though the SINR is poor. A better selection criterion is preferably SINR. The resource availability is checked during the X2AP handover message exchange between the serving cell and the target cell.

So the metric available for UE mobility in an LTE system is . . .

$$RSRQ_\ell = \frac{RSRP_\ell}{2\sum_{i=0}^{M-1} RSRP_i + 10\sum_{i=0}^{M-1} \bar{P}_{Di} + N_0} \quad (14)$$

where it is preferable to have the following metric:

$$\gamma_\ell \propto \frac{RSRP_\ell}{2\sum_{\substack{i=0 \\ i\neq\ell}}^{M-1} RSRP_i + 10\sum_{\substack{i=0 \\ i\neq\ell}}^{M-1} \bar{P}_{Di} + N_0} \quad (15)$$

Additionally, the RSRP and RSSI are averaged over all the OFDM symbols containing RSRE with in a subframe (the measurement specifics are left to the UE implementation—a UE may perform measurements on any OFDM symbol with RSRE based on the opportunity). In an LTE system, first OFDM symbols, up to a maximum of four symbols, within a subframe may be allocated to transmit PDCCH. Furthermore, the DLPA and loading conditions over the first few OFDM symbols, which are assigned for PDCCH within a subframe may differ significantly from the rest of the OFDM symbols. The DLPA on the symbols dedicated to PDCCH is left to the UE implementation. The transmit power over the PDCCH region is applied to ascertain maximum coverage. The power control over PDCCH is less restrictive compared to DLPA employed on PDSCH. Therefore it is desirable to distinguish the OFDM symbols with RSRE in the PDCCH and PDSCH regions.

In general, when UE is moving to a new cell (either in RRC connected state or RRC idle state), the PDCCH reception quality at the new cell is essential for the successful reception. Therefore, the UE may need to know the SINR experienced over each operating region separately.

So the metric available for UE mobility in an LTE system is . . .

$$RSRQ_\ell = \frac{a * RSRP_{\ell\_PDCCH} + b * RSRP_{\ell\_PDSCH}}{2\sum_{i=0}^{M-1}(a * RSRP_{i\_PDCCH} + b * RSRP_{i\_PDSCH}) + 10\sum_{i=0}^{M-1}(a * \bar{P}_{Di\_PDCCH} + b * \bar{P}_{Di\_PDSCH}) + N_0} \quad (16)$$

where a and b represent the scaling factors decided based on the PDCCH region and PDSCH region.

It is preferable to have the following metric:

$$\gamma_{\ell\_PDCCH} \propto \frac{RSRP_{\ell\_PDCCH}}{2\sum_{\substack{i=0 \\ i\neq\ell}}^{M-1} RSRP_{i\_PDCCH} + 10\sum_{\substack{i=0 \\ i\neq\ell}}^{M-1} \bar{P}_{Di\_PDCCH} + N_0} \quad (17)$$

$$\gamma_{\ell\_PDSCH} \propto \frac{RSRP_{\ell\_PDSCH}}{2\sum_{\substack{i=0 \\ i\neq\ell}}^{M-1} RSRP_{i\_PDSCH} + 10\sum_{\substack{i=0 \\ i\neq\ell}}^{M-1} \bar{P}_{Di\_PDSCH} + N_0} \quad (18)$$

Additionally, in an inter-cell interference coordinated (ICIC) network, the radio resources are coordinated among the various nodes, for example, based on the transmit power levels of certain resources. In one example, when in-band relay nodes are deployed, the radio resources used for wireless backhaul communication are coordinated among the donor eNB nodes to avoid interference between access link and the backhaul link. In general it is useful to know the SINR per region whenever, some form of ICIC is applied across the network.

Yet another example where this is necessary is in a network which has mobile relays deployed. The mobile relays may be treated as special UEs which can help other UE's reception or transmission. In this case the resources used for communication between the eNB and the mobile relay and the resources used for communication between the mobile relay and the UE have to be coordinated among the eNB nodes to maximize the overall system gain.

A UE may be handed over to an RN or a donor eNB based on a combination SINRs observed over the backhaul communication link and the access link.

As shown in the equation (3), there are two components to derive $\alpha$:$\eta$, the loading value which corresponds to Capacity value as defined in section 9.2.47 in 3GPP TS 36.423 and $\mu$, the average DRE transmit power relative to the average RSRE transmit power. So capacity value only gives part of the information which is useful when downlink power allocation (DLPA) is not enabled. $\mu$, the average DRE transmit power relative to the average RSRE transmit power for a given cell represents missing information.

Alternatively, an approximate (very coarse) value of $\alpha$ can be obtained from the Relative Narrowband Tx Power value "RNTP" (3GPP TS 36.423, section 9.2.19) which provides (from one eNB to another via the X2 interface) an indication on DL power restriction per PRB in a cell and other information needed by a neighbor eNB node for interference aware scheduling. However, here it should be noted that the RNTP value is a two level value indicating whether the RNTP of a RB or a group RBs is above the RNTP threshold in the future transmissions and hence does not provide a full solution.

Accordingly, in certain embodiments, the invention provides a method and system for formulating an SINR metric for cells using only the existing RSRP and RSRQ measurements. With this method and system side information is exchanged between eNBs of an E-UTRAN using the X2 interface (see e.g., FIG. 1) where the X2 interface carries the X2 Application Protocol (X2AP). The side information is introduced either within X2AP messages exchanged between eNB nodes or via modification of existing X2AP messages. Serving cell system information block (SIB) messages may also be modified or new SIB messages introduced to facilitate computation of an SINR metric at a UE.

More specifically, in certain embodiments side information is exchanged between neighboring cells over the X2 interface to enable a recipient cell/eNB to remove bias introduced into reported UE measurements by the loading of the cell and the DLPA. This can be done by including additional parameters in X2AP message.

In this aspect, the second term on the right hand side of Equation (12) can be expressed as:

$$\frac{R_{1\ell}}{R_{0\ell}} = 5\alpha_\ell \quad (19)$$

where $$\alpha_\ell = \left\langle \frac{1}{N} \sum_{j=0}^{N-1} u_i(j)\mu_i(j) \right\rangle,$$

as defined earlier in Equation (3).

$$\alpha_\ell = \eta_\ell \left\langle \frac{1}{N_\mathbb{R}} \sum_{j \in \mathbb{R}} u_\ell(j) \right\rangle \quad (20)$$

Where $\mathbb{R}$ represents the set of RBs over which cell-l is actively transmitting. $N_\mathbb{R}$ is the size of set $\mathbb{R}$. $\eta_l$ represents the system load of cell-l, which is defined as the ratio of the average number of RBs over which there is active transmission to the total number of RBs available over a specific observation interval. $\mu_l(j)$ represents the ratio of the average transmit power per DRE to the average transmit power per RSRE over the OFDM symbol with RSRE for cell-l and RB j.

The parameter $\alpha_l$ can be interpreted as L3 filtered value of the average transmit power of DRE over the OFDM symbol with RSRE to the average transmit power of the RSRE. The average transmit power of the DRE is calculated as the total transmit power over all the DREs other than RSRE divided by the total number of available DREs. The DREs may include the DREs assigned to dedicated transmission to the UEs (PDSCH), DREs for PBCH and the DREs not assigned any transmission.

As indicated in Equation (20), the parameter $\alpha_l$ is a function of the transmission parameters at cell-l. If the serving cell is aware of a of all the neighbouring cells, a reasonable indication of SINR can be derived from the reported RSRP and RSRQ from the UE. Similarly if the UE is aware of $\alpha$s of the neighbouring cells, UE can select an appropriate cell to camp-on. In the current LTE system, $\alpha$ is not available to the UE or the eNB.

From Equation (20), a plurality of conclusions may be reached. For example, with respect to the RRC connected state, the serving cell-l can convert the RSRQ and RSRP values reported by the UE into meaningful SINR values with the knowledge of $\alpha$ (and RSRP) from all or some of the neighboring cells. This will in turn improve the hand-over performance. The serving node obtains $\alpha$ of the neighboring cells over wireline/wireless backhaul, in addition to $P_0$, the average transmit power of RSRE. (The average transmit power of the RSRE is already exchanged among the neighbor cells according to the current standards.) Additionally, $\alpha$ and a power boosting parameter ($P_B$) (see e.g., Equation 2) can either be sent to the neighboring cells periodically or based on a predefined event. In general $\alpha$ is L3 filtered over a number of subframes and sent to the neighboring nodes. Also, with respect to the RRC Idle state, a UE's cell selection/reselection can also be improved if as from all or some of the cells are advertised by the camped cell. These values may be advertised to all the associated UEs as part of system information block over BCH or even via some dedicated signaling. Since the RSRQ and RSRP measurements are measured over the OFDM symbols with RSRE, when calculating average SINR over DRE, the transmit power over OFDM symbols without RSRE may also be considered. So in addition to $\alpha$ the neighbor node may also send $P_B$, where $P_B$ is the ratio of average transmit power of the DRE in the OFDM symbol without RSRE to the average transmit power of the RSRE. For improving the bandwidth efficiency, the $\alpha$s of the cells can be differentially encoded. Alternatively, $\alpha$ can be quantized to reduce the required bandwidth. Yet another alternative is to indicate the lowest value of alpha, $\alpha_{min}$ and the maximum value of alpha, $\alpha_{min}$ and variable quantization levels.

Figure 10:
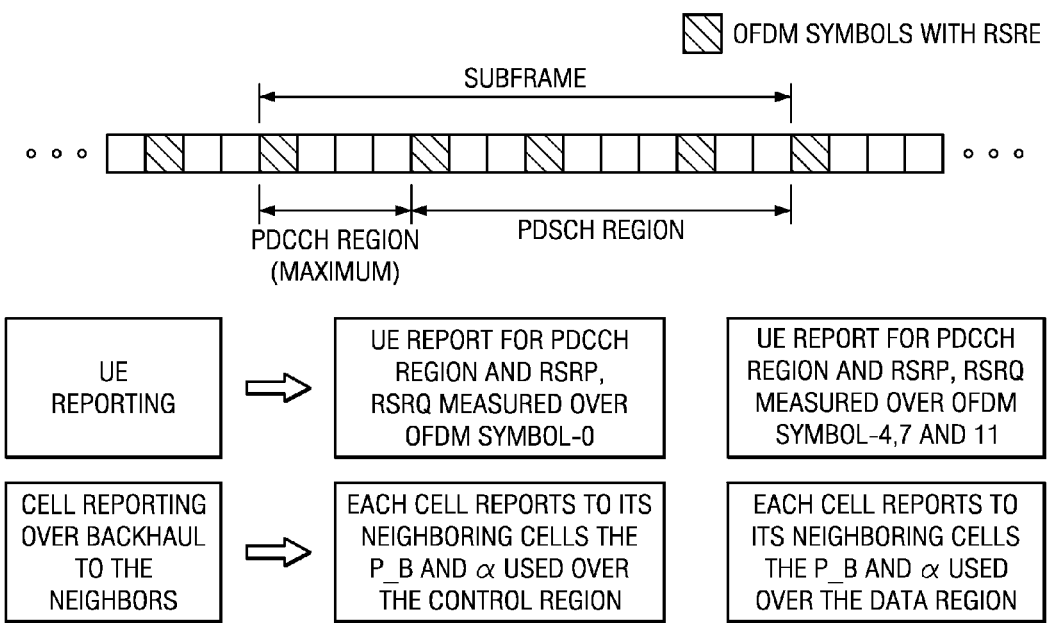
FIG. 10 shows a block diagram of separate measurement reporting per control and data regions.

Additionally, in certain other embodiments, based on each coverage area of the eNB (dependent on the transmit power level of the eNB and network interference management), the inter-cell interference over the control channel region and the data channel region may differ. Furthermore, in the case of asynchronous transmission from the network nodes and different DLPA over the control and data regions may cause larger imbalance between the inter-cell interference levels observed over the two regions. For example, as depicted in FIG. 10, the first few OFDM symbols, up to a maximum of 4 OFDM symbols can be dedicated for PDCCH transmission. The control channel region may be readjusted over time by the serving cell based on various factors such as number of active UEs and their QoS requirements etc. The remaining OFDM symbols are used for data transmission.

In a heterogeneous deployment, a UE in active mode can make separate RSRP and RSRQ measurements over the PDCCH region and the PDSCH region to the serving cell. Similarly, a UE in idle mode can make separate measurements and make cell selection/reselection based on the SINR observed over the PDCCH region or PDSCH region.

Additionally, in certain other embodiments, the method and system can be modified to include separate side information for PDCCH and PDSCH regions. Additionally, in certain other embodiments, the PDCCH and PDSCH regions and/or the separate side information for the PDCCH and the PDSCH may also be informed to the UE by the high layer signaling such as SIBs, for proper measurement feedback.

Additionally, in certain other embodiments, when the resource usage by various network nodes is coordinated to contain the inter-cell interference, a UE may perform the measurements and group the measurements according to the instructions from the serving node.

For example some subframes may be dedicated to femto nodes and other subframes to macro nodes (thus providing time sharing between macro and femto deployment layers). In this scenario, when the UE is performing the measurements with respect to the femto nodes, only those frames dedicated to the femto nodes are used. Similarly the resources can be coordinated in the frequency domain also. In that case the UE performs the measurements in the RBs which are assigned to the specific node.

Figure 11:
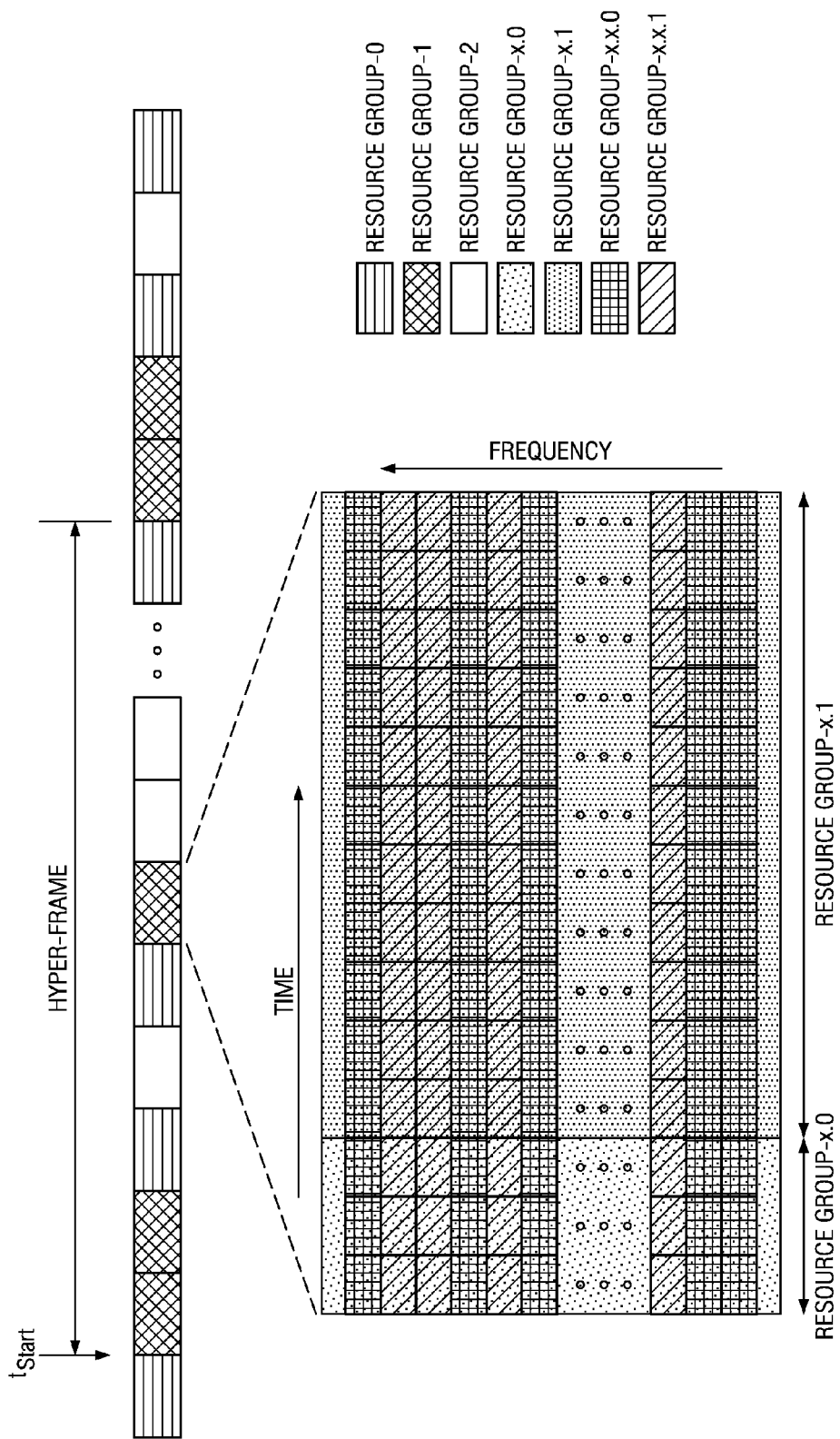
FIG. 11 shows an example of resource partitioning for inter-cell interference coordination.

FIG. 11 shows an example of resource partitioning for improved interference management. A group of subframes, K consecutive subframes starting at time $t_{Start}$, referred to as hyper-frame is defined. It is preferable that K and $t_{Start}$ are agreed among all the cells. However, in some other embodiments, K and $t_{Start}$ for different cells may be different. Based on the required bandwidth for each communication link, the K subframes can be sub divided into multiple resource groups. Within each subframe, the available resources may further be grouped in frequency and time scales as shown. For example, resources groups defined in terms of subframes within the hyper-frame can be based on each communication link, such as access link related femto nodes, pico nodes, etc., or the wireless backhaul link between a relay node and the access node. The resource group x.1/2/3 may be defined based on the control channel region, data channel region and control region for relay nodes etc. The resource groups x.x.1/2/3 can be defined based on the interference coordination within each access link in terms of RBs.

Figure 12:
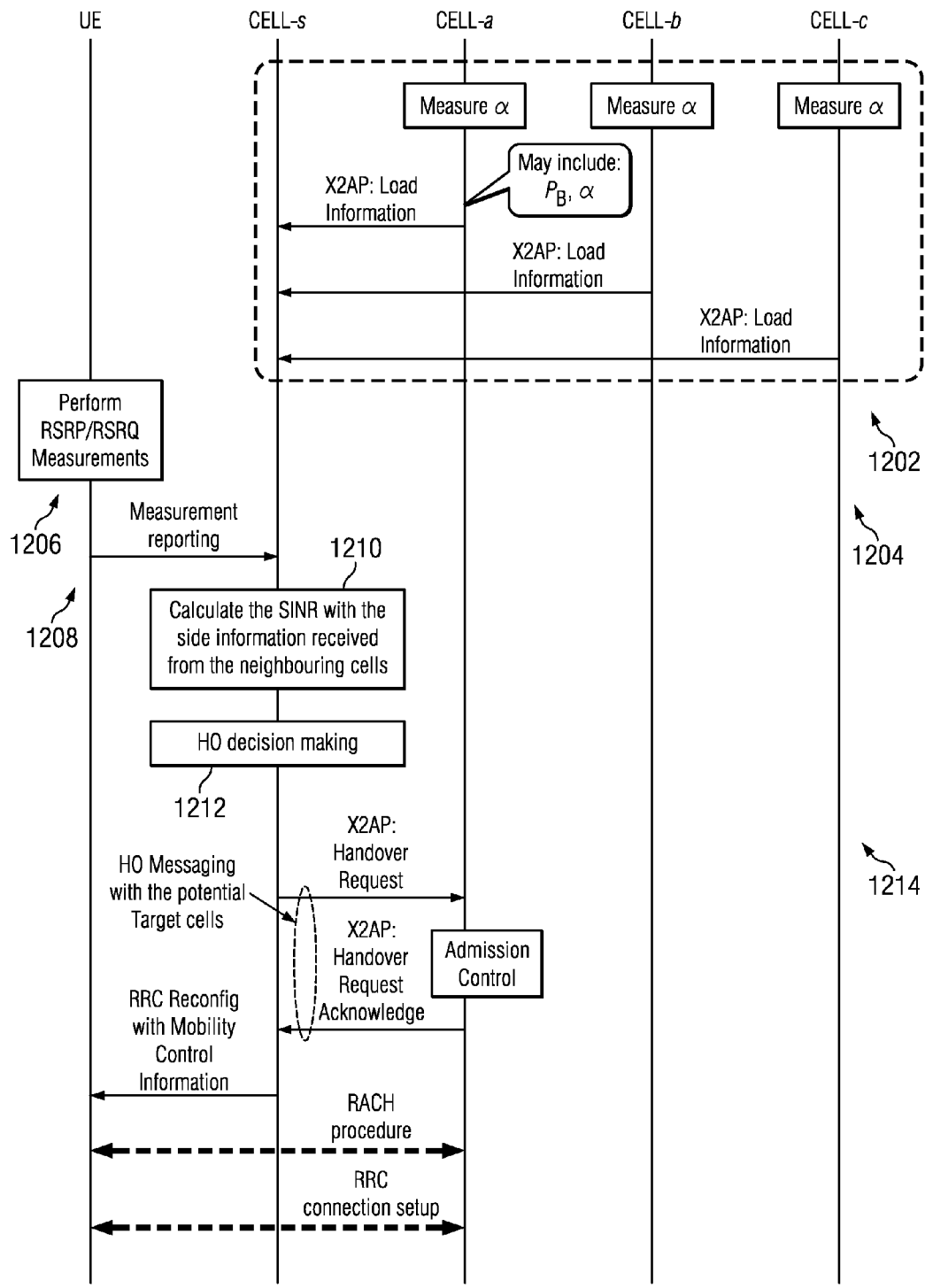
FIG. 12 shows a timing diagram of modified coordination among network nodes to improve UE connected mode mobility.

Referring to FIG. 12, an example of procedures that may be performed with network controlled (e.g. connected mode) mobility is shown. More specifically, at step 1202, each cell-l measures $\alpha_l$ (i.e. in its own cell) over the subframes and obtains an average value in subframe i, $\bar{\alpha}_l(i)$ by applying L3 filtering, for example, as:

$$\bar{\alpha}_l(i) = g\alpha_l(i) + (1-g)\bar{\alpha}_l(i-1) \quad (21)$$

where g represents the L3 filtering parameter; $0 \leq g \leq 1$. The L3 filtering parameter is decided by the cell based on various factors such as, in-coming call rate etc.

$$\alpha_\ell(i) = \left\langle \frac{1}{K} \sum_{j=0}^{K-1} u_i(j)\mu_i(j) \right\rangle \quad (22)$$

Next, at step 1204, all the cells send Load information (including the measured $\alpha_l$) to all its neighbouring cells over the X2 interface ($\alpha$ can be the sent to the neighbouring cells reusing the existing message (i.e. by defining a new IE) or defining a new message.) This information can be sent either periodically or non-periodically, e.g., on-demand reporting. As part of this reporting, $\bar{\alpha}$ as defined in Equation (21) may also be added. $\bar{\alpha}$ may be exchanged between the cells preferably in a bandwidth efficient manner (particularly useful if X2 messages are exchanged over wireless interface). For example, $\bar{\alpha}$ can be efficiently sent as a normalized value to reduce the bandwidth over the backhaul (this is more important for a wireless X2 link). The normalized value of $\bar{\alpha}$ can be defined as:

$$\bar{\alpha}_{normalized} = \frac{\bar{\alpha}}{E_{max\_nom}^p} \text{ where} \quad (23)$$

$$E_{max\_nom}^p = \frac{P_{max}^p}{N_{RB}^{DL} N_{SC}^{RB} \Delta f}$$

$P_{max}^P$ is the base station maximum output power described in 3GPP TS 36.104.

$N_{SC}^{RB}$ is the resource block size in the frequency domain, expressed as a number of subcarriers.

$N_{RB}^{DL}$ is the downlink bandwidth configuration, expressed in multiples of $N_{SC}^{RB}$.

$\Delta f$ indicates subcarrier spacing.

Either a 4 bit or 5 bit value may be enough to cover the dynamic range of $\bar{\alpha}_{normalized}$. Alternatively, $\alpha_{normalized}$ can also be sent to the neighbor cells by reusing the RNTP Threshold field in RNTP IE in X2AP: Load Information message. If the RNTP Threshold is set to $\bar{\alpha}_{normalized}$, then no additional bandwidth is required for the backhaul messaging. However note that depending on the ICIC algorithm of a specific implementation, reusing RNTP Threshold may impact the system performance In that case, a new bit field for $\bar{\alpha}_{normalized}$ in X2AP: Load Information can be defined.

Next, at step 1206, UE may perform RSRP and RSRQ measurements with respect to the neighbouring cells if the measurement event is requested by the serving cell or triggered based on parameters provided to the UE by the serving cell (the measurement may be configured or triggered based on either dedicated signalling from the serving cell to the UE or based on common signalling information contained within the cells system information block).

Next, at step 1208, UE may report the L3 filtered RSRP and RSRQ measurements with respect to the serving cell and the neighbouring cells to the serving cell based on a measurement request sent to the UE by the serving cell. L3 filtering parameter may be specified by the serving cell within the measurement request message. The request to perform measurements may be broadcast by the serving cell via system information or may be sent via dedicated signalling to the UE such as in a measurement configuration message or "measConfig" information element. Alternatively, the UE may report filtered RSRP and RSRQ measurements as part of an RRC connection setup procedure in which case the measurements may be included in existing RRC signalling messages (such as RRC connection request or RRC connection setup complete) or in newly-defined RRC messages exchanged during connection setup. Note that the inclusion of RSRP and RSRQ measurements at an early stage during RRC connection setup may allow the eNB to identify (in conjunction with the neighbour cell Load Information) another preferred cell prior to any significant data transfer with the UE.

Next, at step 1210, upon receiving the RSRP and RSRQ report from the UE, the serving cell may convert the RSRP and RSRQ values into meaningful SINR values. This is done with the help of the most recent $\bar{\alpha}$s received from the neighbouring cells. An example procedure for RSRQ to SINR conversion based on the side information $\bar{\alpha}$ is outlined below:

$$a = \frac{1}{RSRQ_\ell} \quad (24)$$

$$b = 2 + 10\bar{\alpha}_\ell$$

-continued

If $(a > b)$ $\gamma_\ell = 12/(a - b)$ else $\gamma_\ell = \gamma_{\ell\_MAX}$ where $\gamma_{l\_MAX}$ is the maximum SINR and may be set by the eNB.

Based on the expected DL SINR that the serving cell calculates the UE would experience once the UE moves to that target, the serving cell may short list the potential target cells and may select a preferred cell for the UE.

The serving cell initiates handover to the selected cell at step 1212. HO commands are exchanged with the potential target cells to check the availability of resources in the potential cells and their willingness to accept the incoming UE (with the QoS requirements). This process may be performed sequentially with the potential target cells (if the handover failure occurs with the previous target cell).

The UE is handed over to the target cell at step 1214.

Figure 13:
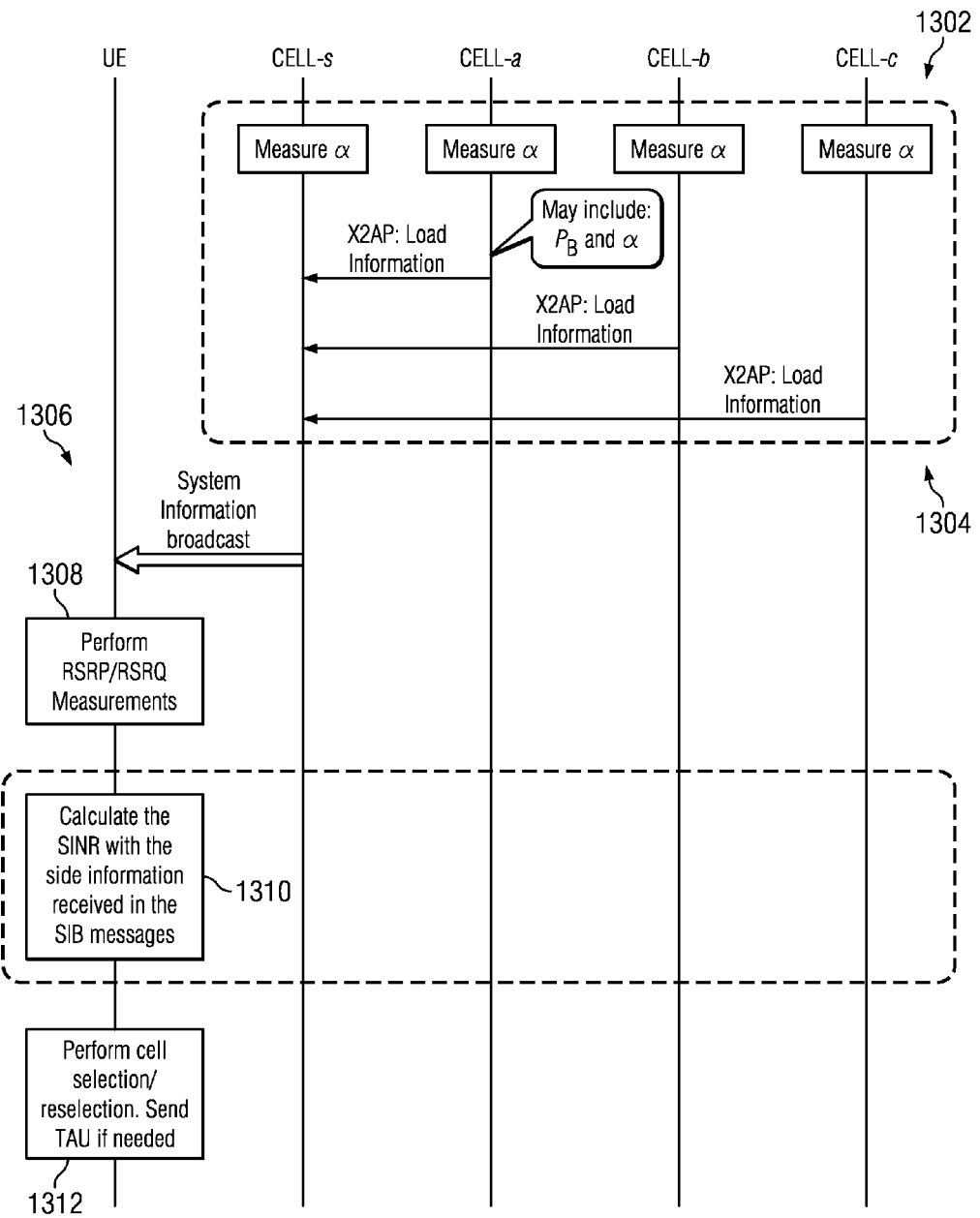
FIG. 13 shows a timing diagram of modified coordination among network nodes to improve UE idle mode mobility.

Referring to FIG. 13, an example of procedures that may be performed when implementing the solution with UE controlled (e.g. idle mode) mobility is shown. More specifically, at step 1302, each cell-l measures $\alpha_l$ over the subframes and obtains an average value in subframe i, $\overline{\alpha}_l(i)$ by applying L3 filtering similar to step 1202 of the example shown in FIG. 12. Additionally at step 1302, all the cells send Load information to all their neighbouring cells (or a selected subset of neighbour cells) over the X2 interface. This procedure is identical to step 1204 of the example shown in FIG. 12.

Next at step 1306, the serving cell may include the $\overline{\alpha}$s of the neighbouring cells as part of its system information block. For improving the bandwidth efficiency, the $\overline{\alpha}$s of the cells can be differentially encoded. Alternatively, $\overline{\alpha}$ can be quantized to reduce the required bandwidth. Yet another alternative is to indicate the lowest value of alpha, $\overline{\alpha}_{min}$ and the maximum value of alpha, $\overline{\alpha}_{min}$ and variable quantization levels.

At step 1308, the UE may perform the RSRP and RSRQ measurements with respect to the serving cell and various neighbour cells during its normal idle mode mobility procedures such as cell selection and reselection. In case of cell reselection, the measurement may be triggered when the RSRP and/or RSRQ with respect to the current camped cell is less than a predefined threshold.

Next, at step 1310, the UE may calculate SINR based on the RSRP, RSRQ and the side information received over the system information block from the camped cell. An example procedure for RSRQ to SINR conversion based on the side information $\overline{\alpha}$ is:

$$a = \frac{1}{RSRQ_\ell}$$

$$b = 2 + 10\overline{\alpha}_\ell$$

If $(a > b)$ $\gamma_\ell = 12/(a - b)$ else $\gamma_\ell = \gamma_{\ell\_MAX}$ where $\gamma_{l\_max}$ is the maximum SINR and may be set by the UE.

At step 1312, the UE may decide to camp on a different cell based on the expected DL SINR that the UE calculates it might experience for one or more measured target cells. If the tracking area advertised by the new cell is different to the previous tracking area, the UE performs a Tracking Area Update (TAU) at the new cell.

Figure 14:
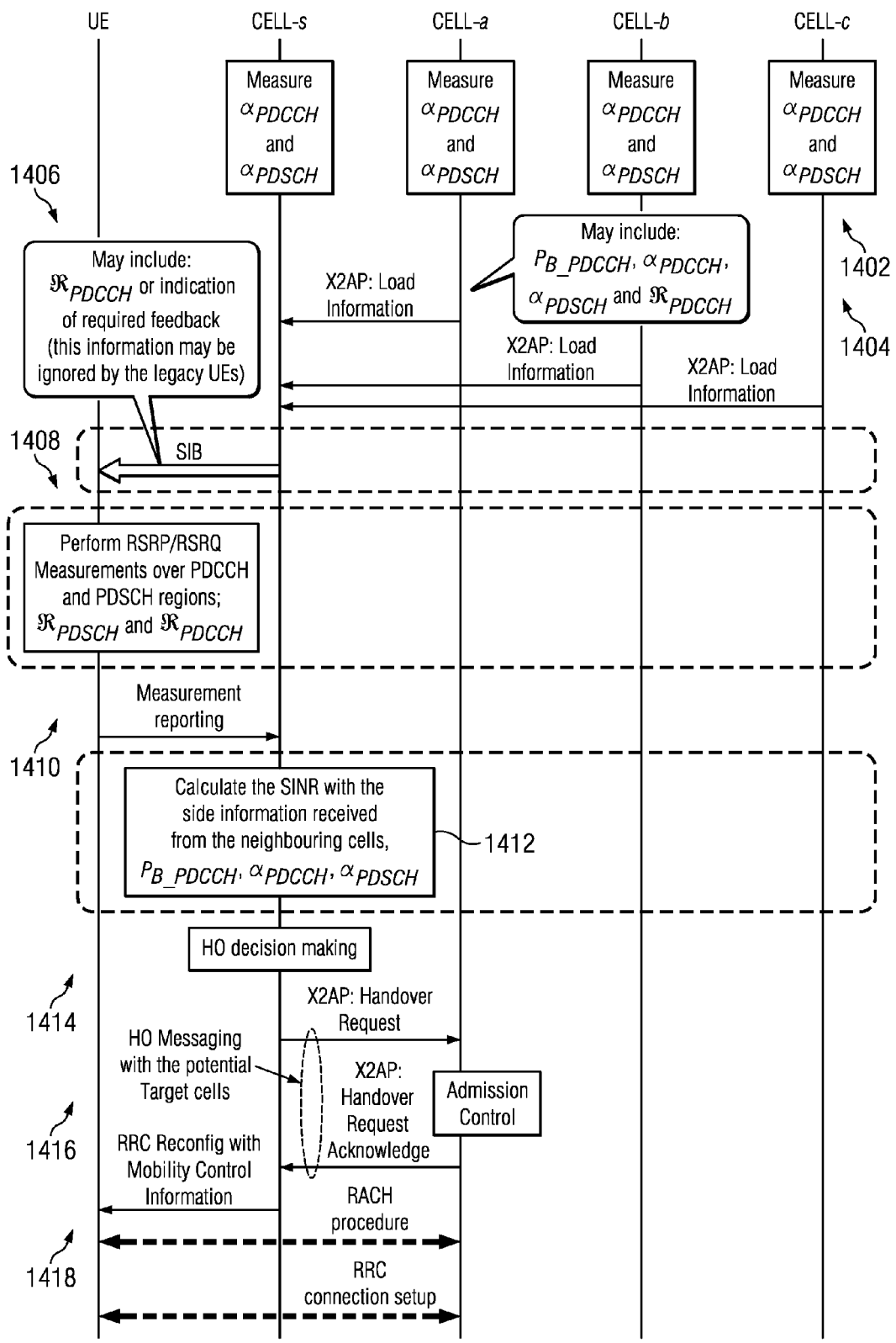
FIG. 14 shows a timing diagram of modified coordination among network nodes to improve UE idle mode mobility.

Referring to FIG. 14, an example of procedures that may be performed with network controlled (e.g. connected mode) mobility is shown. More specifically, at step 1402 each cell-l measures $\alpha_{l\_PDCCH}$ over the OFDM symbols dedicated for PDCCH and $\alpha_{l\_PDSCH}$ over the OFDM symbols dedicated for PDSCH and obtains an average value in subframe i, $\overline{\alpha}_{l\_PDCCH}(i)$ and $\alpha_{l\_PDSCH}(i)$ by applying L3 filtering as shown in Equation (21).

Next, at step 1404, all the cells send Load information to all its neighbouring cells over the X2 interface. As mentioned earlier, this information can be sent either periodically or non-periodically. As part of this reporting, $\overline{\alpha}$ for PDCCH and PDSCH may also be added. The power boosting parameter, $P_{B\_PDCCH}$ used for the OFDM symbol in the PDCCH region may also be included. Further, the OFDM symbols within a subframe used to broadcast PDCCH may also be specified. This information may be specified by including the number of OFDM symbols used for PDCCH. Typically, the PDCCH region descriptor, $\Re_{PDCCH}$ may have the following format: [the number of OFDM symbols dedicated to PDCCH]. This concept can be extended to R-PDCCH also. $\Re_{R\text{-}PDCCH}$ may have the following format: $T_{start}$, $T_{stop}$, $RB_{start}$, $\Delta RB$], where $T_{start}$ and $T_{stop}$ represent the OFDM symbol number at which the R-PDCCH may start and stop respectively. $RB_{start}$ and $\Delta RB$ define the starting RB and the width in RBs respectively. $\overline{\alpha}$ can be sent as a normalized value to conserve the bandwidth as described with respect to step 1204 of the example shown in FIG. 12.

At step 1406, in the system information block, the serving/camped cell may indicate the PDCCH region for each of its neighbours. This information may be restricted to only the first-tier neighbors to conserve the over-the-air bandwidth. This information is used by the UEs to measure the region specific RSRP/RSRQ values.

At step 1408, a UE may perform RSRP and RSRQ measurements with respect to the neighbouring cells if the measurement event is triggered based on the serving cell's system information block. The UE may perform these measurements for PDCCH and PDSCH regions separately.

Next, at step 1410, the UE may report the PDCCH and PDSCH specific L3 filtered RSRP and RSRQ measurements with respect to the serving cell and the neighbouring cells to the serving cell based on a measurement report request sent to the UE by the serving cell. The request to perform measurements may be broadcast by the serving cell via system information or may be sent via dedicated signalling to the UE such as in a measurement configuration message or "measConfig" information element. Alternatively, the UE may report the PDCCH and/or PDSCH specific L3 filtered RSRP and RSRQ measurements as part of an RRC connection setup procedure in which case the measurements may be included in existing RRC signalling messages (such as RRC connection request or RRC connection setup complete) or in newly-defined RRC messages exchanged during connection setup. Note that the inclusion of PDCCH and PDSCH specific RSRP and RSRQ measurements at an early stage during RRC connection setup may allow the eNB to identify (in conjunction with the neighbour cell Load Information) another preferred cell prior to any significant data transfer with the UE.

Upon receiving the RSRP and RSRQ reports for PDCCH and PDSCH from the UE, the serving cell may convert those values into meaningful SINR values as specified in Equation 25 at step 1412. This is done with the help of the most recent $\overline{\alpha}$s received from the neighboring cells.

Based on the expected DL SINR UE experiences once the UE moves to that target, the serving cell may short list the potential target cells at step 1414. HO commands are exchanged at step 1416 with the potential target cells to check the availability of resources at the potential cells and the willingness to accept the incoming UE (with the QoS requirements). This process may be performed sequentially with the potential target cells (if the handover failure occurs with the previous target cell).

The UE is handed over to the target cell at step 1418.

Figure 15:
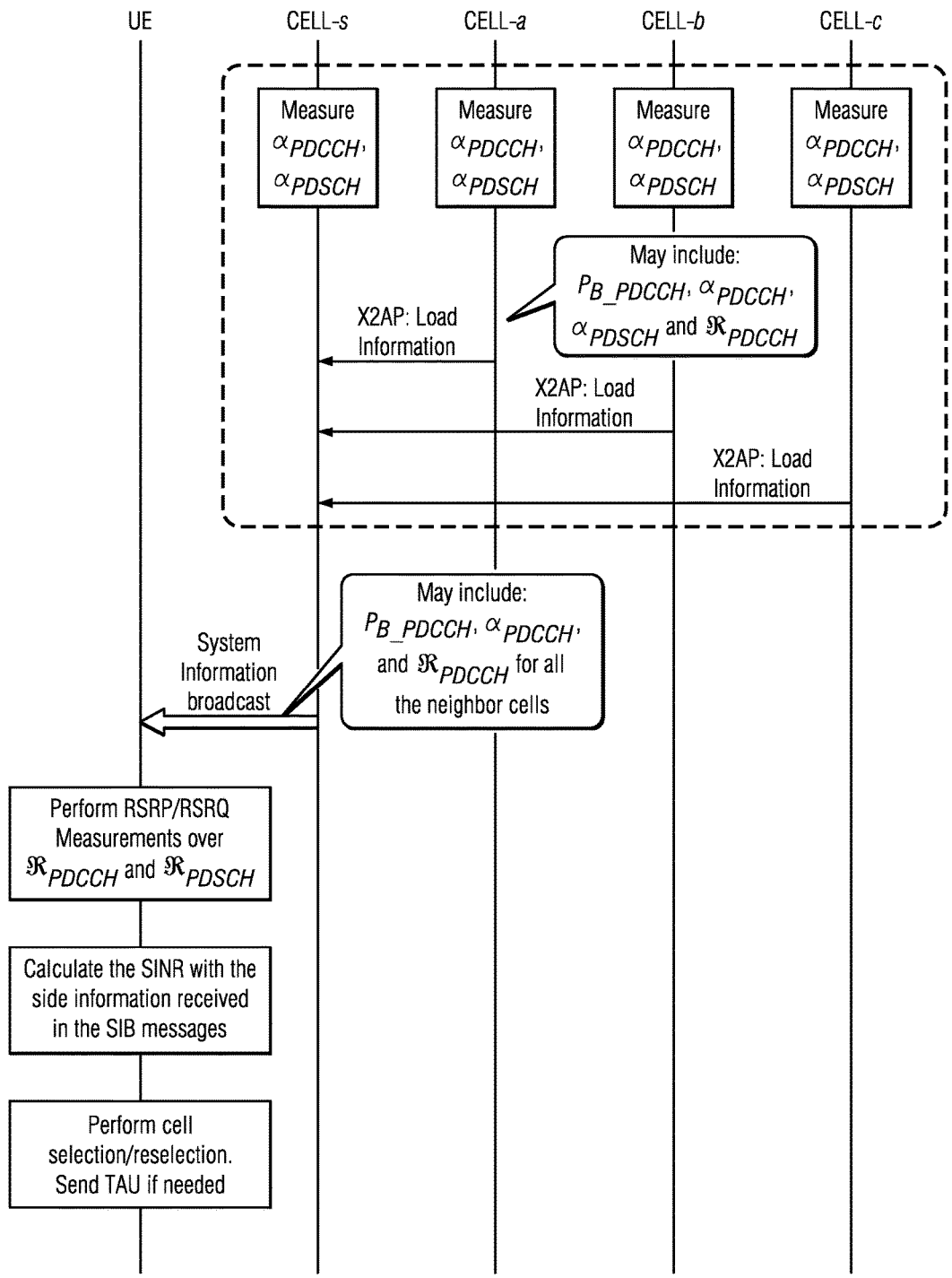
FIG. 15 shows a timing diagram of modified coordination among network nodes to improve UE idle mode mobility.

Referring to FIG. 15, an example of procedures that may be performed with UE controlled (e.g. idle mode) mobility is shown. More specifically, each cell-l measures $\alpha_{l\_PDCCH}$ over the OFDM symbols dedicated for PDCCH and $\alpha_{l\_PDSCH}$ over the OFDM symbols dedicated for PDSCH and obtains an average value in subframe i, $\overline{\alpha}_{l\_PDCCH}(i)$ and $\overline{\alpha}_{l\_PDSCH}(i)$ by applying L3 filtering as shown as described with respect to step 1402 of the example shown in FIG. 14.

The serving cell may include the $\overline{\alpha}$s and the resource regions for PDCCH and/or PDSCH of the neighbouring cells as part of its system information block. For improving the bandwidth efficiency, any of the methods mentioned in the previous section can be used.

UE may perform the RSRP and RSRQ measurements over the PDCCH and PDSCH resource regions with respect to all the cells in case of initial network attach or with respect to the neighbouring cells in case of cell reselection. In case of cell reselection, the measurement may be triggered when the RSRP and/or RSRQ with respect to the current camped cell drops below a predefined threshold.

UE may calculate SINR for PDCCH and PDSCH based on the RSRP, RSRQ measured and the side information received over the system information block from the camped cell as described with respect to step 1310 of the example shown in FIG. 13.

The UE may decide to camp on a different cell based on the expected DL SINR that the UE calculates it might experience for one or more measured target cells. If the tracking area advertised by the new cell is different to the previous tracking area, the UE performs a Tracking Area Update (TAU) in the new cell.

Figure 16:
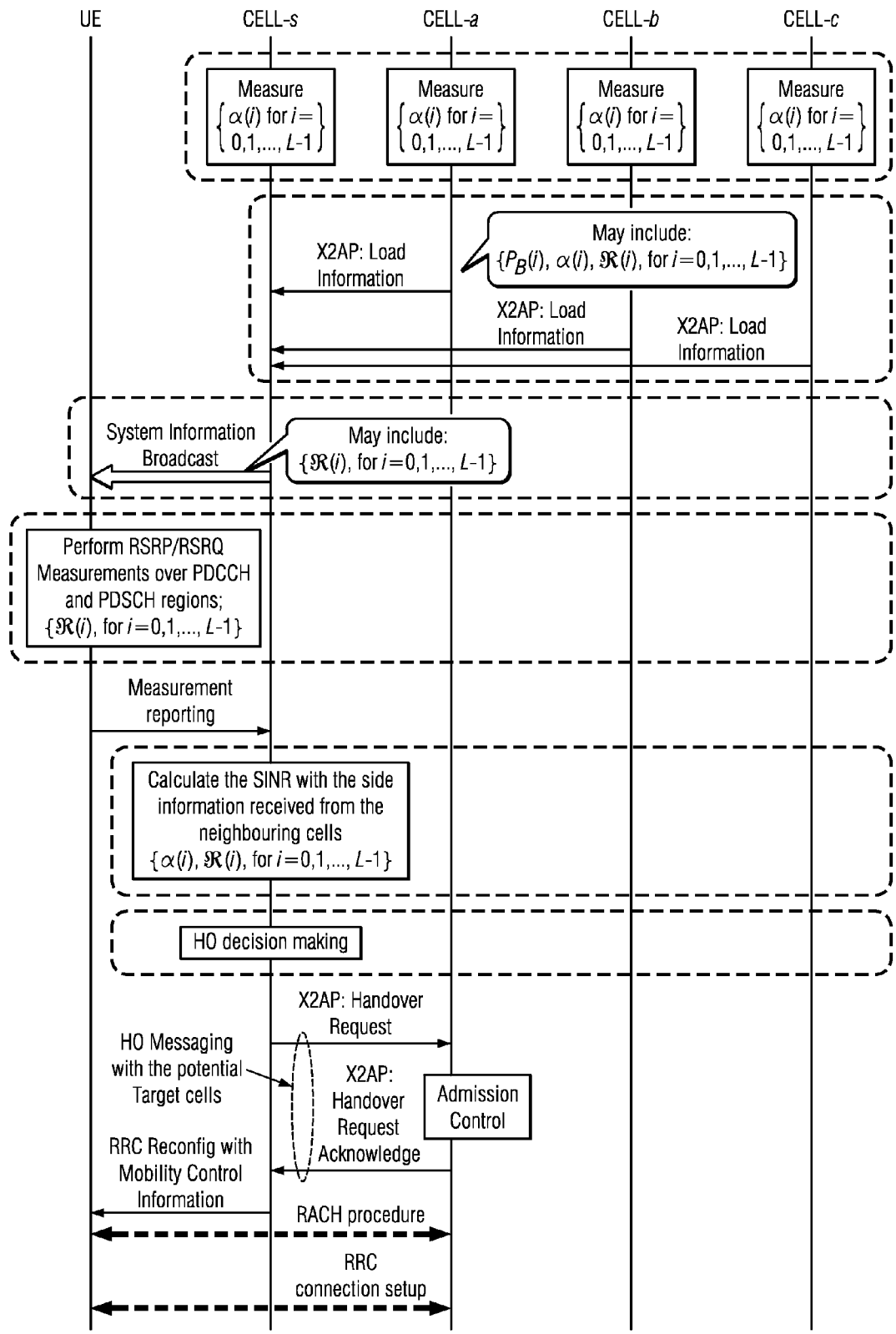
FIG. 16 shows a timing diagram of modified coordination among network nodes to improve UE idle mode mobility.

Referring to FIG. 16 an example of procedures that may be performed with network controlled (e.g. connected mode) mobility is shown. More specifically, each cell-l measures $\alpha_l(i)$ over resource region $\Re(i)$, i=0, 1, . . . , L−1 in each subframe and obtains an average value in subframe j, $\alpha_l(j)$ by applying L3 filtering as shown in Equation (21).

All the cells send Load information to neighbouring cells over the X2 interface. This information can be sent either periodically or non-periodically. As part of this reporting, $\overline{\alpha}_l(i)$ for ith region may also be added. The power boosting parameter, $P_B(i)$ used for the OFDM symbol in the ith region may also be included. Further, the OFDM symbols and PRBs within a subframe used for the ith region may also be specified or specified in a different message due to its semi-static characteristics, e.g., some initial configuration messages. This information may be specified by including at least one of a starting OFDM symbol number, an ending OFDM symbol number, a radio frame number within the hyper-frame (or radio frame number map), a starting PRB number, an ending PRB number and an indication of physical channel usage, for example, PDCCH, R-PDCCH, PDSCH etc. This information could also be specified by the specification or certain default configurations hence no signaling exchange is needed.

The parameter $\overline{\alpha}$ can be sent as a normalized value to conserve the bandwidth as described in step 1214 of the example shown in FIG. 12.

The serving cell may include the resource region used for different physical channels in its system information block to facilitate the UE measuring the region specific RSRP/RSRQ measurements.

A UE may perform RSRP and RSRQ measurements with respect to the neighbouring cells if the measurement event is triggered based on the serving cell's system information block. The UE may perform these measurements for each resource region separately.

UE may report the L3 filtered RSRP and RSRQ measurements with respect to the serving cell and the neighbouring cells for each resource region to the serving cell based on a measurement report request sent to the UE by the serving cell. The request to perform measurements may be broadcast by the serving cell via system information or may be sent via dedicated signalling to the UE such as in a measurement configuration message or "measConfig" information element. Alternatively, the UE may report filtered RSRP and RSRQ measurements for each resource region as part of an RRC connection setup procedure in which case the measurements may be included in existing RRC signalling messages (such as RRC connection request or RRC connection setup complete) or in newly-defined RRC messages exchanged during connection setup. Note that the inclusion of RSRP and RSRQ measurements at an early stage during RRC connection setup may allow the eNB to identify (in conjunction with the neighbour cell Load Information) another preferred cell prior to any significant data transfer with the UE. The measurement report may include measurements for some resource regions only. A definition of the regions and which regions should be reported-on may be signalled to the UE by the serving cell. One example use case is that of mobile relay.

Upon receiving the RSRP and RSRQ reports for each resource region for all the neighbouring cells from the UE, the serving cell may convert the RSRP and RSRQ values into meaningful SINR values as specified in equation (24). This is done with the help of the most recent $\overline{\alpha}$s received from the neighboring cells.

Based on the expected DL SINR that the UE might experience if moved to that target, the serving cell may short list the potential target cells. DL SINR considered in the HO decision making may be UE specific. The handover decision may depend on the signal quality observed over certain resource regions based on the type of UE and the target cell. For example, if the target cell is a type I relay node, the SINR observed over the resources dedicated to the access link of the target RN and the SINR observed over the resources dedicated to the wireless backhaul link between the target RN and its donor eNB may impact the handover decision. Similarly, if a mobile relay is going through a handover, the SINR observed over the resources dedicated to the wireless backhaul link may be considered in deciding the target cell. Similar procedures are applicable when a UE is moving from/to a femto or pico cell to/from a macro cell.

HO commands are exchanged with the potential target cells to check the availability of resources at the potential cells and the willingness to accept the incoming UE (with the QoS requirements). This process may be performed sequentially with the potential target cells (if the handover failure occurs with the previous target cell).

The UE is handed over to the target cell.

Figure 17:
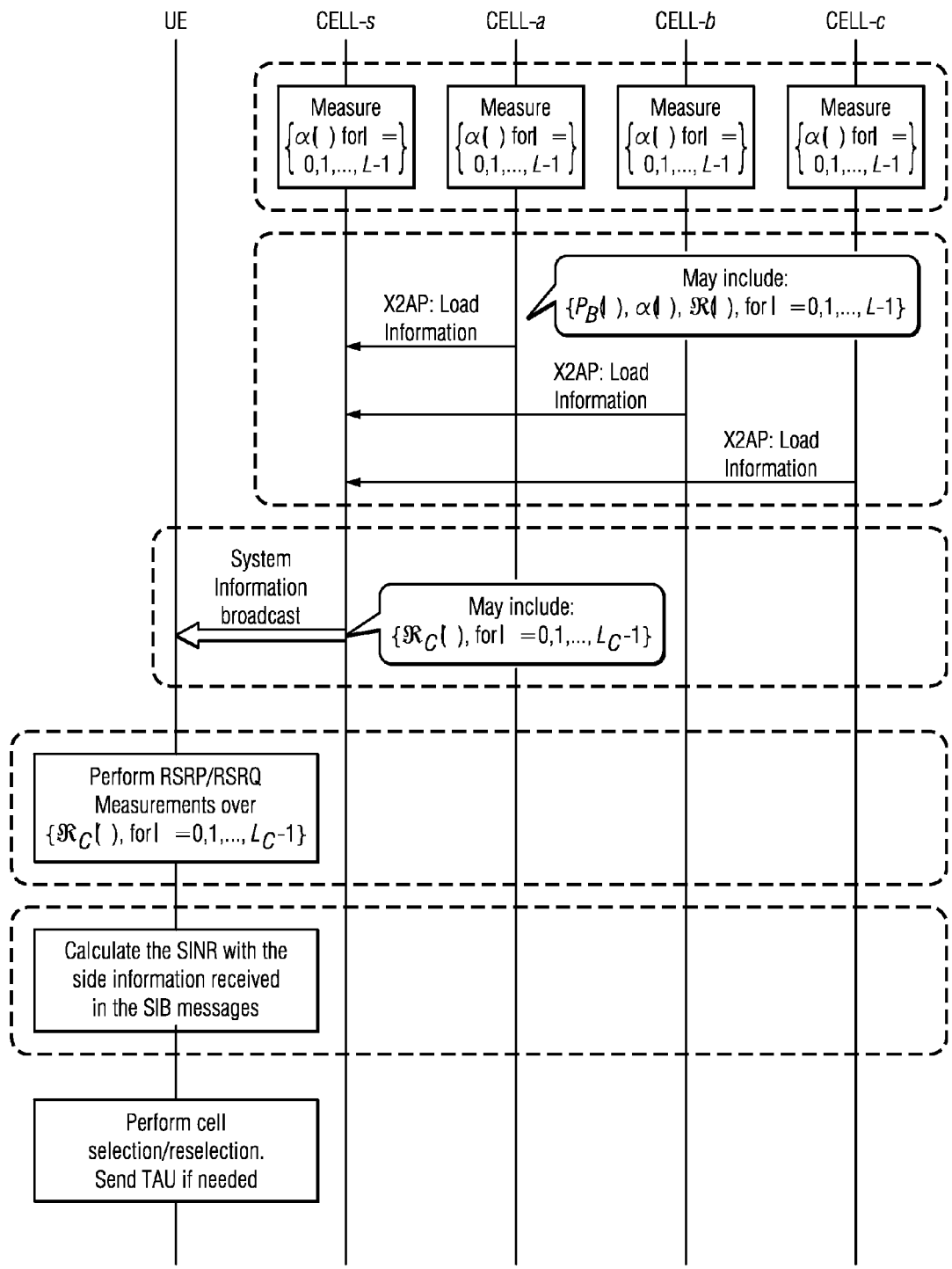
FIG. 17 shows a timing diagram of modified coordination among network nodes to improve UE idle mode mobility.

Referring to FIG. 17, an example of procedures that may be performed with UE controlled (e.g. idle mode) mobility is shown. More specifically, the steps shown in the example of FIG. 17 are similar to the steps shown in the example shown in FIG. 15 where the procedure is generalized to include multiple resource regions.

Figure 18:
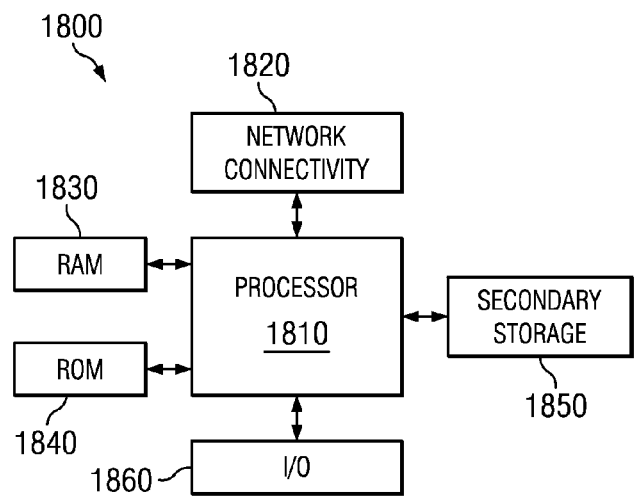
FIG. 18 depicts an exemplary system in which the present invention may be implemented.

FIG. 18 illustrates an example of a system 1800 suitable for implementing one or more embodiments disclosed herein. In various embodiments, the system 1800 comprises a processor 1810, which may be referred to as a central processor unit (CPU) or digital signal processor (DSP), network connectivity devices 1820, random access memory (RAM) 1830, read only memory (ROM) 1840, secondary storage 1850, and input/output (I/O) devices 1860. In some embodiments, some of these components may not be present or may be combined in various combinations with one another or with other components not shown. These components may be located in a single physical entity or in more than one physical entity. Any actions described herein as being taken by the processor 1810 might be taken by the processor 1810 alone or by the processor 1810 in conjunction with one or more components shown or not shown in FIG. 18.

The processor 1810 executes instructions, codes, computer programs, or scripts that it might access from the network connectivity devices 1820, RAM 1830, or ROM 1840. While only one processor 1810 is shown, multiple processors may be present. Thus, while instructions may be discussed as being executed by a processor 1810, the instructions may be executed simultaneously, serially, or otherwise by one or multiple processors 1810 implemented as one or more CPU chips.

In various embodiments, the network connectivity devices 1820 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1820 may enable the processor 1810 to communicate with the Internet or one or more telecommunications networks or other networks from which the processor 1810 might receive information or to which the processor 1810 might output information.

The network connectivity devices 1820 may also be capable of transmitting or receiving data wirelessly in the form of electromagnetic waves, such as radio frequency signals or microwave frequency signals. Information transmitted or received by the network connectivity devices 1820 may include data that has been processed by the processor 1810 or instructions that are to be executed by processor 1810. The data may be ordered according to different sequences as may be desirable for either processing or generating the data or transmitting or receiving the data.

In various embodiments, the RAM 1830 may be used to store volatile data and instructions that are executed by the processor 1810. The ROM 1840 shown in FIG. 18 may be used to store instructions and perhaps data that are read during execution of the instructions. Access to both RAM 1830 and ROM 1840 is typically faster than to secondary storage 1850. The secondary storage 1850 is typically comprised of one or more disk drives or tape drives and may be used for non-volatile storage of data or as an over-flow data storage device if RAM 1830 is not large enough to hold all working data. Secondary storage 1850 may be used to store programs that are loaded into RAM 1830 when such programs are selected for execution. The I/O devices 1860 may include liquid crystal displays (LCDs), touch screen displays, keyboards, keypads, switches, dials, mice, track balls, voice recognizers, card readers, paper tape readers, printers, video monitors, or other well-known input/output devices.

Figure 19:
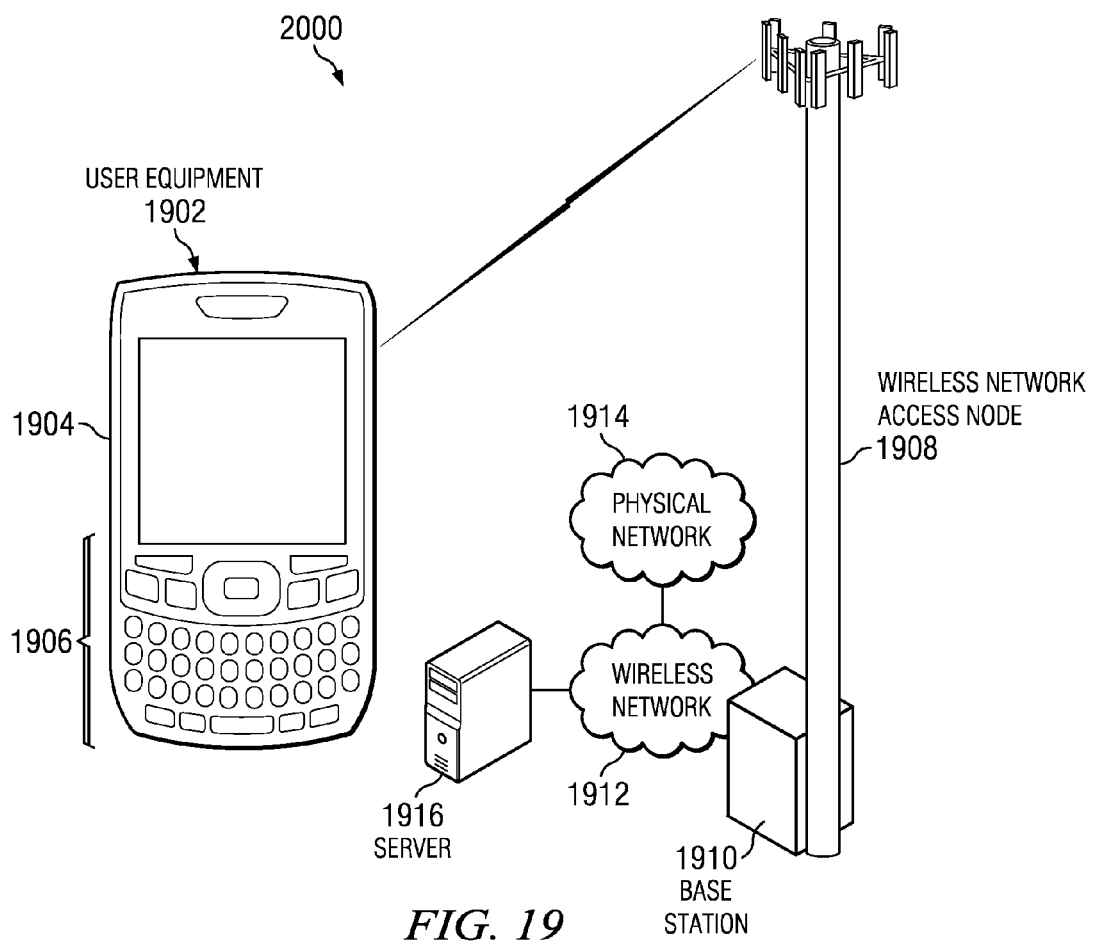
FIG. 19 shows a wireless communications system including an embodiment of a user equipment (UE).

FIG. 19 shows a wireless communications system including an embodiment of user equipment (UE) 1902. Though illustrated as a mobile phone, the UE 1902 may take various forms including a wireless handset, a pager, a personal digital assistant (PDA), a portable computer, a tablet computer, or a laptop computer. Many suitable devices combine some or all of these functions. In some embodiments, the UE 1902 is not a general purpose computing device like a portable, laptop or tablet computer, but rather is a special-purpose communications device such as a mobile phone, a wireless handset, a pager, a PDA, or a telecommunications device installed in a vehicle. The UE 1902 may likewise be a device, include a device, or be included in a device that has similar capabilities but that is not transportable, such as a desktop computer, a set-top box, or a network node. In these and other embodiments, the UE 1902 may support specialized activities such as gaming, inventory control, job control, and/or task management functions, and so on.

In various embodiments, the UE 1902 includes a display 1904. The UE 1902 likewise includes a touch-sensitive surface, a keyboard or other input keys 1906 generally used for input by a user. In these and other environments, the keyboard may be a full or reduced alphanumeric keyboard such as QWERTY, Dvorak, AZERTY, and sequential keyboard types, or a traditional numeric keypad with alphabet letters associated with a telephone keypad. The input keys may likewise include a trackwheel, an exit or escape key, a trackball, and other navigational or functional keys, which may be inwardly depressed to provide further input function. The UE 1902 may likewise present options for the user to select, controls for the user to actuate, and cursors or other indicators for the user to direct.

The UE 1902 may further accept data entry from the user, including numbers to dial or various parameter values for configuring the operation of the UE 1902. The UE 1902 may further execute one or more software or firmware applications in response to user commands. These applications may configure the UE 1902 to perform various customized functions in response to user interaction. Additionally, the UE 1902 may be programmed or configured over-the-air (OTA), for example from a wireless base station 1910, a server 1916, a wireless network access node 1908, or a peer UE 1902.

Among the various applications executable by the system 1800 are a web browser, which enables the display 1904 to display a web page. The web page may be obtained via wireless communications with a wireless network access node 1908, such as a cell tower, a peer UE 1902, or any other wireless communication network 1912 or system. In various embodiments, the wireless network 1912 is coupled to a wired network 1914, such as the Internet. Via the wireless network 1912 and the wired network 1914, the UE 1902 has access to information on various servers, such as a server 1916. The server 1916 may provide content that may be shown on the display 1904. Alternately, the UE 1902 may access the wireless network 1912 through a peer UE 1902 acting as an intermediary, in a relay type or hop type of connection. Skilled practitioners of the art will recognized that many such embodiments are possible and the foregoing is not intended to limit the spirit, scope, or intention of the disclosure.

Figure 20:
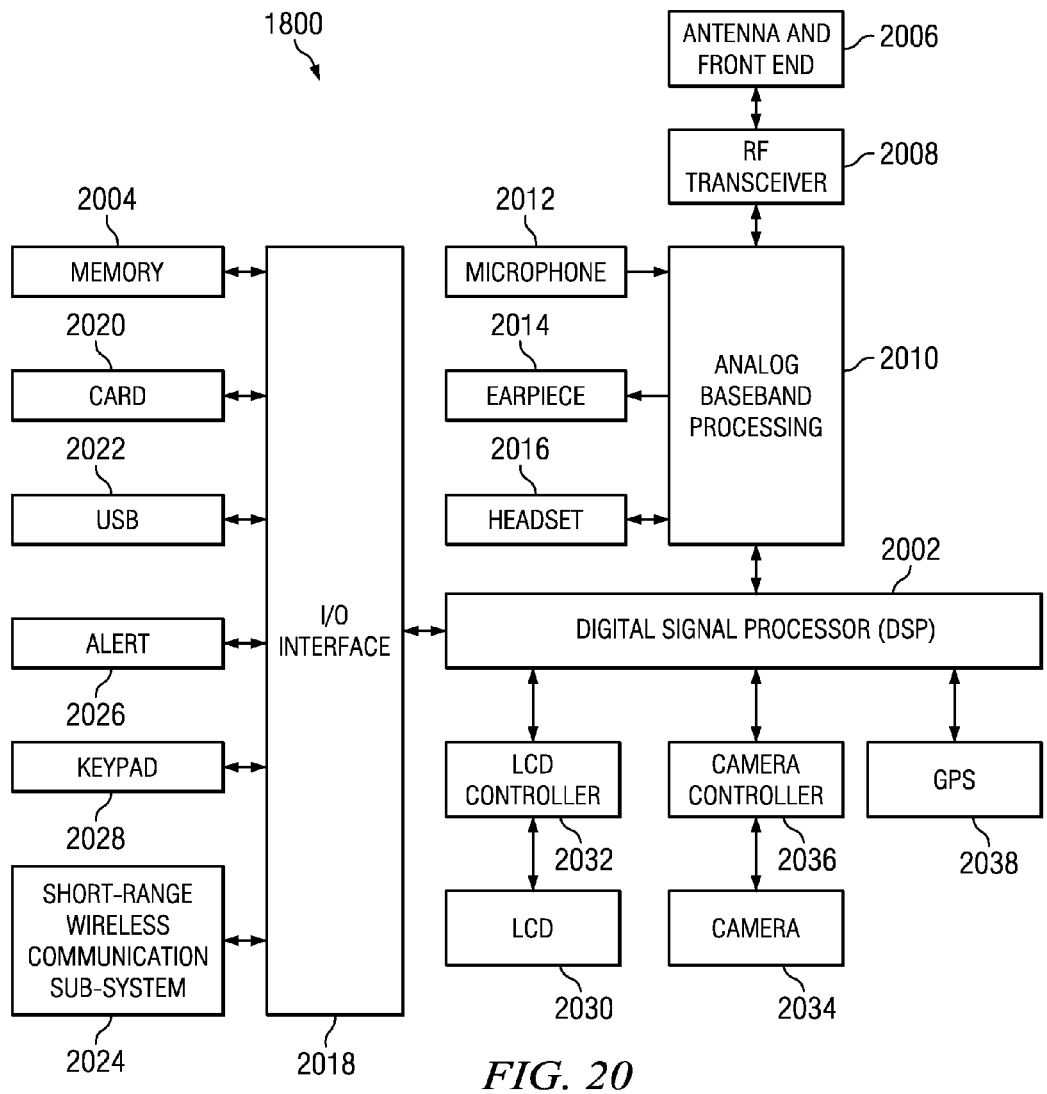
FIG. 20 is a simplified block diagram of an exemplary UE comprising a digital signal processor (DSP).

FIG. 20 depicts a block diagram of an exemplary user equipment (UE) 1902 in which the present invention may be implemented. While various components of a UE 1902 are depicted, various embodiments of the UE 1902 may include a subset of the listed components or additional components not listed. As shown in FIG. 20, the UE 1902 includes a digital signal processor (DSP) 2002 and a memory 2004. As shown, the UE 1902 may further include an antenna and front end unit 2006, a radio frequency (RF) transceiver 2008, an analog baseband processing unit 2010, a microphone 2012, an earpiece speaker 2014, a headset port 2016, an input/output (I/O) interface 2018, a removable memory card 2020, a universal serial bus (USB) port 2022, a short range wireless communication sub-system 2024, an alert 2026, a keypad 2028, a liquid crystal display (LCD) 2030, which may include a touch sensitive surface, an LCD controller 2032, a charge-coupled device (CCD) camera 2034, a camera controller 2036, and a global positioning system (GPS) sensor 2038. In various embodiments, the UE 1902 may include another kind of display that does not provide a touch sensitive screen. In an embodiment, the DSP 2002 may communicate directly with the memory 2004 without passing through the input/output interface 2018.

In various embodiments, the DSP 2002 or some other form of controller or central processing unit (CPU) operates to control the various components of the UE 1902 in accordance with embedded software or firmware stored in memory 2004 or stored in memory contained within the DSP 2002 itself. In addition to the embedded software or firmware, the DSP 2002 may execute other applications stored in the memory 2004 or made available via information carrier media such as portable data storage media like the removable memory card 2020 or via wired or wireless network communications. The application software may comprise a compiled set of machine-readable instructions that configure the DSP 2002 to provide the desired functionality, or the application software may be high-level software instructions to be processed by an interpreter or compiler to indirectly configure the DSP 2002.

The antenna and front end unit 2006 may be provided to convert between wireless signals and electrical signals, enabling the UE 1902 to send and receive information from a cellular network or some other available wireless communications network or from a peer UE 1902. In an embodiment, the antenna and front end unit 1806 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 2006 may include antenna tuning or impedance matching components, RF power amplifiers, or low noise amplifiers.

In various embodiments, the RF transceiver 2008 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 2010 or the DSP 2002 or other central processing unit. In some embodiments, the RF Transceiver 1808, portions of the Antenna and Front End 2006, and the analog base band processing unit 2010 may be combined in one or more processing units and/or application specific integrated circuits (ASICs).

The analog baseband processing unit 2010 may provide various analog processing of inputs and outputs, for example analog processing of inputs from the microphone 2012 and the headset 2016 and outputs to the earpiece 2014 and the headset 2016. To that end, the analog baseband processing unit 2010 may have ports for connecting to the built-in microphone 2012 and the earpiece speaker 2014 that enable the UE 1902 to be used as a cell phone. The analog baseband processing unit 2010 may further include a port for connecting to a headset or other hands-free microphone and speaker configuration. The analog baseband processing unit 2010 may provide digital-to-analog conversion in one signal direction and analog-to-digital conversion in the opposing signal direction. In various embodiments, at least some of the functionality of the analog baseband processing unit 2010 may be provided by digital processing components, for example by the DSP 2002 or by other central processing units.

The DSP 2002 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 2002 may perform modulation, coding, interleaving, and spreading, and for a receiver function the DSP 2002 may perform despreading, deinterleaving, decoding, and demodulation. In another embodiment, for example in an orthogonal frequency division multiplex access (OFDMA) technology application, for the transmitter function the DSP 2002 may perform modulation, coding, interleaving, inverse fast Fourier transforming, and cyclic prefix appending, and for a receiver function the DSP 2002 may perform cyclic prefix removal, fast Fourier transforming, deinterleaving, decoding, and demodulation. In other wireless technology applications, yet other signal processing functions and combinations of signal processing functions may be performed by the DSP 2002.

The DSP 2002 may communicate with a wireless network via the analog baseband processing unit 2010. In some embodiments, the communication may provide Internet connectivity, enabling a user to gain access to content on the Internet and to send and receive e-mail or text messages. The input/output interface 2018 interconnects the DSP 2002 and various memories and interfaces. The memory 2004 and the removable memory card 2020 may provide software and data to configure the operation of the DSP 2002. Among the interfaces may be the USB interface 2022 and the short range wireless communication sub-system 2024. The USB interface 2022 may be used to charge the UE 1902 and may also enable the UE 1902 to function as a peripheral device to exchange information with a personal computer or other computer system. The short range wireless communication sub-system 2024 may include an infrared port, a Bluetooth interface, an IEEE 802.11 compliant wireless interface, or any other short range wireless communication sub-system, which may enable the UE 1902 to communicate wirelessly with other nearby mobile devices and/or wireless base stations.

The input/output interface 2018 may further connect the DSP 2002 to the alert 2026 that, when triggered, causes the UE 1902 to provide a notice to the user, for example, by ringing, playing a melody, or vibrating. The alert 2026 may serve as a mechanism for alerting the user to any of various events such as an incoming call, a new text message, and an appointment reminder by silently vibrating, or by playing a specific pre-assigned melody for a particular caller.

The keypad 2028 couples to the DSP 2002 via the I/O interface 2018 to provide one mechanism for the user to make selections, enter information, and otherwise provide input to the UE 1902. The keyboard 2028 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 2030, which may include touch screen capability and also display text and/or graphics to the user. The LCD controller 2032 couples the DSP 2002 to the LCD 2030.

The CCD camera 2034, if equipped, enables the UE 1902 to take digital pictures. The DSP 2002 communicates with the CCD camera 2034 via the camera controller 2036. In another embodiment, a camera operating according to a technology other than Charge Coupled Device cameras may be employed. The GPS sensor 2038 is coupled to the DSP 2002 to decode global positioning system signals, thereby enabling the UE 1902 to determine its position. Various other peripherals may also be included to provide additional functions, such as radio and television reception.

Figure 21:
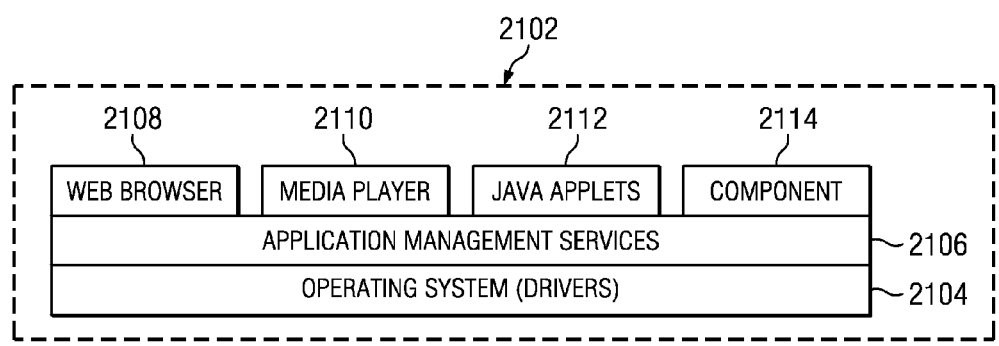
FIG. 21 is a simplified block diagram of a software environment that may be implemented by the DSP.

FIG. 21 illustrates a software environment 2102 that may be implemented by the DSP 2002. The DSP 2002 executes operating system drivers 2104 that provide a platform from which the rest of the software operates. The operating system drivers 2104 provide drivers for the UE 1902 hardware with standardized interfaces that are accessible to application software. The operating system drivers 2104 include application management services (AMS) 2106 that transfer control between applications running on the UE 1902. Also shown in FIG. 21 are a web browser application 2108, a media player application 2110, and Java applets 2112. The web browser application 2108 configures the UE 1902 to operate as a web browser, allowing a user to enter information into forms and select links to retrieve and view web pages. The media player application 2110 configures the UE 1902 to retrieve and play audio or audiovisual media. The Java applets 2112 configure the UE 1902 to provide games, utilities, and other functionality. A component 2114 might provide functionality described herein. The UE 1902, a base station 1910, and other components described herein might include a processing component that is capable of executing instructions related to the actions described above.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A method for controlling user equipment (UE) mobility comprising:
identifying a plurality of candidate cells, each of the plurality of candidate cells corresponding to a target cell for UE handover;
receiving, from a UE, at least one of:
a reference signal receive power (RSRP) measurement of a serving cell and a neighboring cell of the plurality of candidate cells; or
a reference signal receive quality (RSRQ) measurement of the serving cell and the neighboring cell of the plurality of candidate cells; and,
transmitting, to the UE, a handover message indicating the target cell based upon at least one of the received RSRP or RSRQ of the serving cell and the neighboring cell, and side information exchanged between the serving cell and the neighbor cell, wherein the side information comprises an average transmit power level of data Resource Elements (REs) divided by an average power level of Reference Signal Resource Elements (RSRE) for the neighbor cell.

2. The method of claim 1 wherein:
the serving cell exchanges the side information with the neighboring cell of the plurality of candidate cells.

3. The method of claim 2 wherein:
the side information further comprises a parameter included within an X2 application protocol (X2AP) message.

4. The method of claim 3 wherein:
the parameter comprise at least one of a set of resource blocks over which a cell is actively transmitting, a size of the set of resource blocks, a system load of the cell.

5. The method of claim 3 wherein:
the parameter comprises at least one of a filtered value of an average transmit power of a data resource element over an orthogonal frequency division multiplexing symbol.

6. The method of claim 5 wherein:
the average transmit power of the data resource element is based upon a total transmit power over all data resource elements other than a reference symbol resource element divided by a total number of available data resource elements.

7. The method of claim 1 wherein:
each of the plurality of candidate cells correspond to a target cell for camping; and
the UE determines an appropriate cell to camp on based upon the side information received over a system information broadcast.

8. The method of claim 1 wherein:
the RSRP measurement is measured over a physical downlink control channel (PDCCH); and,
the RSRQ measurement is measured over the PDCCH.

9. The method of claim 1 wherein:
the RSRP measurement is measured over a physical downlink shared channel PDSCH; and,
the RSRQ measurement is measured over the PDSCH.

10. A network node of a serving cell in a wireless network comprising:
one or more processor;
a non-transitory computer-readable storage medium coupled to the one or more processors and storing programming instructions for execution by the one or more processors, the programming instructions instruct the one or more processors to:
identify a plurality of candidate cells, each of the plurality of candidate cells corresponding to a target cell for UE handover;
receive, from a UE, at least one of:
a reference signal receive power (RSRP) measurement of a serving cell and a neighboring cell of the plurality of candidate cells; or
a reference signal receive quality (RSRQ) measurement of the serving cell and the neighboring cell of the plurality of candidate cells; and,
transmit, to the UE, a handover message indicating the target cell based on at least one of the RSRP measurement or the RSRQ measurement received from the UE and side information received from neighboring cells, wherein the side information comprises an average transmit power level of data Resource Elements (REs) divided by an average power level of Reference Signal Resource Elements (RSRE) for each of the neighbor cells.

11. The network node of claim 10 wherein:
the serving cell receives at least one of the RSRP or the RSRQ measurements from the UE and further exchanges the side information with the neighboring cells.

12. The network node of claim 11 wherein:
the side information further comprises a parameter included within an X2 application protocol (X2AP) message.

13. The network node of claim 12 wherein:
the parameter comprise at least one of a set of resource blocks over which a cell is actively transmitting, a size of the set of resource blocks, a system load of the cell.

14. The network node of claim 12 wherein:
the parameter comprises at least one of a filtered value of an average transmit power of a data resource element over an orthogonal frequency division multiplexing symbol.

15. The network node of claim 14 wherein:
the average transmit power of the data resource element is based upon a total transmit power over all data resource elements other than a reference symbol resource element divided by a total number of available data resource elements.

16. The network node of claim 10 wherein:
each of a plurality of candidate cells correspond to a target cell for camping; and
the processor is configured for sending, to the UE, the side information over a system information broadcast, wherein the UE determines an appropriate cell to camp on based upon the side information received over the system information broadcast.

17. The network node of claim 10 wherein:
the RSRP measurement is measured over a physical downlink control channel (PDCCH); and,
the RSRQ measurement is measured over the PDCCH.

18. The network node of claim 10 wherein:
the RSRP measurement is measured over a physical downlink shared channel PDSCH; and,
the RSRQ measurement is measured over the PDSCH.

19. A user equipment (UE) served by a wireless network comprising:
one or more processors;
a non-transitory computer-readable storage medium coupled to the one or more processors and storing programming instructions for execution by the one or more processors, the programming instructions instruct the one or more processors to:
send at least one of a reference signal receive power (RSRP) measurement or a reference signal receive quality (RSRQ) measurement to a serving cell, wherein the serving cell controls UE mobility, and the serving cell exchanges side information with a neighbor cell of a plurality of candidate cells, the side information comprising an average transmit power level of data Resource Elements (REs) divided by an average power level of Reference Signal Resource Elements (RSRE) for the neighbor cell; and
receive a handover message indicating a target cell based upon at least one of the received RSRP or RSRQ of the serving cell and the neighboring cell, and the side information exchanged between the serving cell and the neighbor cell.

20. The UE of claim 19 wherein:
the side information further comprises a parameter included within an X2 application protocol (X2AP) message.

21. The UE of claim 20 wherein:
the parameter comprises at least one of a set of resource blocks over which a cell is actively transmitting, a size of the set of resource blocks, a system load of the cell.

22. The UE of claim 20 wherein:
the parameter comprises at least one of a filtered value of an average transmit power of a data resource element over an orthogonal frequency division multiplexing symbol.

23. The UE of claim 22 wherein:
the average transmit power of the data resource element is based upon a total transmit power over all data resource elements other than a reference symbol resource element divided by a total number of available data resource elements.

24. The UE of claim 19 wherein:
each of the plurality of candidate cells correspond to a target cell for camping; and
the UE determines an appropriate cell to camp on based upon the side information received over a system information broadcast.

25. The UE of claim 19 wherein:
the RSRP measurement is measured over a physical downlink control channel (PDCCH); and,
the RSRQ measurement is measured over the PDCCH.

26. The UE of claim 19 wherein:
the RSRP measurement is measured over a physical downlink shared channel PDSCH; and,
the RSRQ measurement is measured over the PDSCH.

* * * * *

UNITED STATES PATENT AND TRADEMARK OFFICE
CERTIFICATE OF CORRECTION

PATENT NO.       : 9,622,138 B2
APPLICATION NO.  : 13/985764
DATED            : April 11, 2017
INVENTOR(S)      : Chandra Sekhar Bontu et al.

It is certified that error appears in the above-identified patent and that said Letters Patent is hereby corrected as shown below:

On the Title Page

Column 2, (Abstract), Line 11, please delete "SNIR" and insert -- SINIR --, therefor.

In the Claims

In Column 28, Line 3, in Claim 10, delete "processor;" and insert -- processors; --, therefor.

Signed and Sealed this
Twenty-sixth Day of May, 2020

Andrei Iancu
*Director of the United States Patent and Trademark Office*